United States Patent [19]

Iseyama

[11] Patent Number: 5,787,346
[45] Date of Patent: Jul. 28, 1998

[54] RADIO CHANNEL ASSIGNMENT METHOD

[75] Inventor: Takayuki Iseyama, Kawasaki, Japan

[73] Assignee: Fujitsu Limited, Kanagawa, Japan

[21] Appl. No.: 665,765

[22] Filed: Jun. 19, 1996

[30] Foreign Application Priority Data

Dec. 12, 1995 [JP] Japan .................. 7-322968

[51] Int. Cl.⁶ .................. H04Q 7/20; H04B 7/00; H04B 7/212
[52] U.S. Cl. .................. 455/439; 455/524; 370/331; 370/337
[58] Field of Search .................. 455/33.1, 33.2, 455/54.1, 56.1, 8, 436, 439, 524; 379/60; 370/329, 330, 331, 337, 347

[56] References Cited

U.S. PATENT DOCUMENTS

| | | | |
|---|---|---|---|
| 5,109,528 | 4/1992 | Uddenfeldt | 455/33.2 |
| 5,410,737 | 4/1995 | Jones | 455/56.1 |
| 5,471,670 | 11/1995 | Hess et al. | 455/33.2 |
| 5,483,668 | 1/1996 | Malkamaki et al. | 455/33.2 |
| 5,530,700 | 6/1996 | Tran et al. | 455/56.1 |
| 5,548,808 | 8/1996 | Bruckert et al. | 455/56.1 |
| 5,557,603 | 9/1996 | Bartlett et al. | 455/8 |

*Primary Examiner*—Reinhard J. Eisenzopf
*Assistant Examiner*—Sam Bhattacharya
*Attorney, Agent, or Firm*—Helfgott & Karas, P.C.

[57] ABSTRACT

In a radio channel assignment method in a mobile telecommunication system having a plurality of radio base stations and a base station control unit for controlling each of the radio base stations, the base station control unit assigns a radio channel to a mobile station when radio communication is performed, and each radio base station has frequencies shared as radio frequencies with the other radio base stations. When the mobile station, which is communicating using a predetermined radio channel from among a plurality of radio channels in which a shared frequency is employed as radio frequency, moves into an area of another radio base station, the base station control unit confirms status of use of other radio channels than the predetermined radio channel in the shared frequency and assigns to the mobile station a radio channel, which has been in use thus far, as the radio channel in the area of the other radio base station if all of the other radio channels are idle.

10 Claims, 31 Drawing Sheets

FIG. 6

| FREQUENCY | BASE STATION | TRX NO. | BASE STATION USED | SLOT 0 | SLOT 1 | SLOT 2 |
|---|---|---|---|---|---|---|
| F 1 | BASE STATION A | TRX#1 | BASE STATION A | IDLE | IDLE | CONTROL CH |
| | BASE STATION B | TRX#1 | | | | |
| F 2 | BASE STATION A | TRX#2 | BASE STATION A | IN USE MS11 | IDLE | IDLE |
| | BASE STATION B | TRX#2 | | | | |
| F 3 | BASE STATION A | TRX#3 | BASE STATION B | IN USE MS1 | IN USE MS2 | CONTROL CH |
| | BASE STATION B | TRX#3 | | | | |

FIG. 12

| INFORMATION ELEMENT | DIRECTION | TYPE | INFORMATION LENGTH |
|---|---|---|---|
| MESSAGE TYPE | UPWARD | M | 1 |
| RECEPTION LEVEL | UPWARD | M | 1 |
| NUMBER (N) OF SELECTED ZONES | UPWARD | M | 1 |
| CONTROL CHANNEL NO. | UPWARD | O | 1 |
| RECEPTION LEVEL | UPWARD | O | 1 |
| ... | ... | ... | ... |
| CONTROL CHANNEL NO. | UPWARD | O | 1 |
| RECEPTION LEVEL | UPWARD | O | 1 |

FIG. 13

| INFORMATION ELEMENT | DIRECTION | TYPE | INFORMATION LENGTH |
|---|---|---|---|
| MESSAGE TYPE | DOWNWARD | M | 1 |

FIG. 14

| INFORMATION ELEMENT | DIRECTION | TYPE | INFORMATION LENGTH |
|---|---|---|---|
| MESSAGE TYPE | DOWNWARD | M | 1 |
| FREQUENCY CODE | DOWNWARD | M | 2 |
| SLOT NO. | DOWNWARD | M | 1 |
| COLOR CODE | DOWNWARD | M | 1 |
| SCRAMBLE CODE | DOWNWARD | M | 1 |
| MOBILE STATION TRANSMISSION POWER INDICATION | DOWNWARD | M | 1 |
| CHANNEL INFORMATION | DOWNWARD | M | 1 |

FIG. 15

MANAGEMENT TABLE STATUS

| | | RF | #0 | #1 | #2 |
|---|---|---|---|---|---|
| BASE STATION A | TRX#1 | F1 | IDLE | IDLE | C |
| | TRX#2 | F2 | MS11 | IDLE | IDLE |
| | TRX#3 | F3 | BEING USED BY BASE STATION B | | |
| BASE STATION B | TRX#1 | F1 | BEING USED BY BASE STATION A | | |
| | TRX#2 | F2 | BEING USED BY BASE STATION A | | |
| | TRX#3 | F3 | | | C |

18a ↑

| | | RF | #0 | #1 | #2 |
|---|---|---|---|---|---|
| BASE STATION A | TRX#1 | F1 | IDLE | IDLE | C |
| | TRX#2 | F2 | MS11 | IDLE | IDLE |
| | TRX#3 | F3 | BEING USED BY BASE STATION B | | |
| BASE STATION B | TRX#1 | F1 | BEING USED BY BASE STATION A | | |
| | TRX#2 | F2 | WAIT FOR START OF TRANSMISSION | | |
| | TRX#3 | F6 | | | C |

18a ↑

| | | RF | #0 | #1 | #2 |
|---|---|---|---|---|---|
| BASE STATION A | TRX#1 | F1 | IDLE | IDLE | C |
| | TRX#2 | F2 | BEING USED BY BASE STATION B | | |
| | TRX#3 | F3 | BEING USED BY BASE STATION B | | |
| BASE STATION B | TRX#1 | F1 | BEING USED BY BASE STATION A | | |
| | TRX#2 | F2 | MS11 | IDLE | IDLE |
| | TRX#3 | F6 | | | C |

18a ↑

FIG. 18

FIG.20

| INFORMATION ELEMENT | DIRECTION | TYPE | INFORMATION LENGTH |
|---|---|---|---|
| MESSAGE TYPE | DOWNWARD | M | 1 |
| BASE STATION NO. | DOWNWARD | O | 1 |

FIG.21

| INFORMATION ELEMENT | DIRECTION | TYPE | INFORMATION LENGTH |
|---|---|---|---|
| MESSAGE TYPE | DOWNWARD | M | 1 |
| BASE STATION NO. | DOWNWARD | O | 1 |

FIG.24

| INFORMATION ELEMENT | DIRECTION | TYPE | INFORMATION LENGTH |
|---|---|---|---|
| MESSAGE TYPE | DOWNWARD | M | 1 |

FIG.25

| INFORMATION ELEMENT | DIRECTION | TYPE | INFORMATION LENGTH |
|---|---|---|---|
| MESSAGE TYPE | UPWARD | M | 1 |
| RECEPTION LEVEL | UPWARD | M | 1 |
| NUMBER (N) OF SELECTED ZONES | UPWARD | M | 1 |
| CONTROL CHANNEL NO. | UPWARD | O | 1 |
| RECEPTION LEVEL | UPWARD | O | 1 |
| ~ | ~ | ~ | ~ |
| CONTROL CHANNEL NO. | UPWARD | O | 1 |
| RECEPTION LEVEL | UPWARD | O | 1 |

FIG. 33

RADIO CHANNEL ASSIGNMENT METHOD

BACKGROUND OF THE INVENTION

This invention relates to a radio channel assignment method. More particularly, the invention relates to a radio channel assignment method in a time division multiple access mobile telecommunication system having a plurality of radio base stations (base transceiver stations BTS) to which common radio frequencies have been assigned, and a base-station control unit for controlling each of the radio base stations, wherein radio frequencies are used in common by radio base stations and each radio frequency is assigned as a radio channel, on a per time-slot basis, to a mobile station.

For the sake of dealing with dead zones and making more effective utilization of frequency, it is necessary to deploy a plurality of radio base stations in one service area and control the assignment of radio channels by allocating the same carriers (radio frequencies) at each of the plurality of radio base stations. To accomplish this, dynamic channel assignment (DCA) and flexible channel assignment (FCA) are available.

According to DCA, the state of frequency use over the entire service area is monitored whenever a call is generated, and a usable frequency is assigned to the required radio base station each time. In other words, rather than fixedly assigning a frequency to a radio base station, all the frequencies are available over the entire service area and the usable frequencies are assigned to the radio base stations as appropriate. In FCA, a plurality of radio zones share frequencies since the traffic peak differs for each zone. The frequencies are used flexibly between zones. In other words, a frequency is assigned preferentially to a zone that requires to be assigned a frequency, and control is performed in such a manner that the peripheral zones will not use the assigned frequency.

However, when a mobile station is handed over by movement from a current radio base station to an adjacent radio base station (hereinafter referred to as "handover") in these conventional systems, an assignable radio channel may not exist for the adjacent radio base station (the radio base station to which the changeover is to be made). When this situation arises, the mobile station cannot be handed over and enters an adjacent zone without being handed over. The result is that communication quality falls below that stipulated and is cut off. Accordingly, there is need of a method through which communication is allowed to continue even in a case where an assignable radio channel does not exist for a radio base station to which a changeover is to be made.

FIG. 31 is a diagram schematically showing the configuration of a mobile telecommunication system composed of a plurality of radio zones according to the prior art. The system is composed of two radio zones in this illustration.

A mobile station (MS) 1 in FIG. 31 is installed in an automotive vehicle or carried about on one's person. The mobile station 1 has a variety of control functions, such as control of sending and receiving of various signals, control for originating and terminating calls, control for switching radio channels, control of transmission of position registration information, and control for monitoring the reception level of peripheral radio zones. Radio base stations 2, 3 communicate with the mobile unit 1 in the radio zones 4, 5, respectively. The radio base stations 2, 3 control the sending and receiving of various signals, control the origination and termination of calls and control the switching between radio lines. A radio base station control unit 6 performs sequence control at origination/termination of calls and at channel changeover, manages radio lines, etc.

Different radio frequencies are assigned to the two adjacent radio base stations 2 and 3 in such a manner that the frequencies will not interfere. Radio frequencies F1–F3 are assigned to radio base station 2, and frequencies F4–F6 are assigned to radio base station 3. Further, transceivers (TRX#1, TRX#2, TRX#3) are provided for corresponding ones of the radio frequencies F1, F2, F3, and transceivers (TRX#1, TRX#2, TRX#3) are provided for corresponding ones of the radio frequencies F4, F5, F6. The radio frequencies F1–F6 can be assigned to the mobile unit as radio channels per time slots #0–#2. This constructs a TDMA-type mobile telecommunication system. The radio frequency F1 assigned to radio base station 2 in time slot #2 is a control channel CCH, and the radio frequency F4 assigned to radio base station 3 in time slot #2 is a control channel CCH. The mobile station 1 is currently under the control of the radio base station 2 and communicates with another mobile unit or telephone terminal via a prescribed radio channel (frequency F2, time slot #0). The other radio channels are idle channels.

The base station control unit 6 is provided with a management table 6a, in which the status of use of each radio channel (radio frequency and time slot) in each base station is written. The management table 6a is managed by the base station control unit 6 and is used in controlling handover.

FIG. 32 illustrates the handover control sequence. Assume that the mobile station 1 is currently in radio zone 4 of radio base station 2, the reception field strength of the signal from an adjacent base station surpasses a set level owing to movement of the mobile station and the mobile station 1 is handed over from the radio base station 2 ("original radio base station") to the radio base station 3 ("new radio base station").

In FIG. 32, (1) is a "condition report 2" message, namely a message from the mobile station 1 for reporting the state of reception at the mobile station (the reception field strength of the radio waves received from peripheral radio base stations) to the radio base station 2. Upon receiving this message, the radio base station 2 transmits a handover request to the radio base station control unit 6. Next, (2) is a condition report acknowledgment message, namely a message sent from the radio base station 2 to the mobile station 1 to acknowledge reception of condition report 2. Next, (3) is a handover radio channel set message which indicates, to the mobile station, the radio channel to which a changeover is to be made. Further, (4) through (7) are synchronizing bursts SB1 through SB4, namely signals exchanged between the new base station 3 and the mobile station 1 in order to establish frame synchronization. A downward communication burst (8) and an upward communication burst (9) transfer user information and a user-information control signal, e.g., audio and facsimile information, etc.

A radio-channel changeover request signal (10) requests the radio base station control unit 6 for handover. Here the radio base station 2 notifies the radio base station control unit 6 of the fact that message (1) of the condition report 2 which has been received from the mobile station 1.

Further, (11) is a TCH start-up command signal (a radio channel start-up command signal). More specifically, the radio base station control unit 6 selects a radio channel based upon the radio-channel changeover request signal (10) and transfers the TCH start-up command signal to the new base station 3 so as to activate the above-mentioned radio channel. A TCH start-up acknowledgment signal (12) is a signal by which the new base station 3 reports, to the radio base station control unit 6, the fact that the radio channel whose activation has been commanded by the TCH start-up command signal (11) has actually started up. An assigned radio-channel designation signal (13) indicates, to the radio base station 2 that issued the radio-channel changeover request signal (10), the radio channel newly assigned by the radio base station control unit 6.

A synchronization-complete OK signal (14) is a signal by which the radio base station control unit 6 is notified of the fact that the exchange of the synchronizing bursts (4)~(7) between the mobile station 1 and new base station 3 has been performed normally. A TCH start-up complete signal (15) is a signal by which the new base station 3 reports, to the radio base station control unit 6, the fact that the mobile station 1 has begun an exchange normally based upon the communication bursts. A channel-changeover acknowledgment signal (16) is a signal by which the radio base station control unit 6 notifies the original base station 2 of the fact that channel changeover has been completed. A channel-changeover acknowledgment response signal (17) is a signal by which the original base station 2 notifies the radio base station control unit 6 of the fact that the channel-changeover acknowledgment response signal has been received.

Handover is performed in accordance with the sequence of FIG. 32 using the signals described above. More specifically, upon receiving the message (1) of condition report 2, the original radio base station 2 sends the radio-channel changeover request signal (10) to the radio base station control unit 6. Upon receiving the radio-channel changeover request signal (10), the radio base station control unit 6 obtains an idle channel of the new base station 3 by referring to the management table 6a and decides upon this idle channel (time slot #0 of frequency F5) as the new radio channel of mobile station 1. Next, the radio base station control unit 6 instructs the new base station 3 to activate the above-mentioned radio channel, in response to which the new base station 3 activates the channel. Thereafter, the mobile station 1 and new base station 3 exchange the synchronizing bursts (4)~(7) to establish synchronization, after which the exchange of the communication bursts (8), (9) takes place. The mobile station 1 continues communication via the new base station 3.

As the result of handover control, the content of management table 6a changes as shown in FIG. 33.

This frequency allocation method in which different radio frequencies are assigned to the adjacent radio base stations 2, 3 so that the frequencies will not interfere is a rational method as long as there are enough radio frequencies to spare. However, the increasing popularity of mobile stations has resulted in a severe deficiency of available radio frequencies. Consequently, a mobile telecommunication system has been proposed, and put in use, in which a plurality of radio base stations are deployed in one service area, the same carriers (radio frequencies) are allocated to these plurality of deployed radio base stations and radio channels are assigned to a mobile station in such a manner that identical radio frequencies will not be used by the radio base stations simultaneously. Advantages of this scheme are that interference between frequencies can be prevented and a large number of radio channels can be assigned to a radio base station where calls concentrate.

However, depending upon the number of carriers assigned to such a mobile telecommunication system, a situation can arise in which an idle radio channel is not available for a new base station to which a mobile station is handed over, when it becomes necessary to change over the radio channel owing to deterioration of radio-wave reception due to movement of the mobile station that is currently in the process of communicating. If this happens, the radio channel for the mobile station cannot be changed over until an assignable radio channel becomes idle.

FIG. 34 is a diagram schematically showing the configuration of a mobile telecommunication system in which the same frequencies are assigned to adjacent radio base stations. Elements identical with those shown in FIG. 31 are designated by like reference characters. Here radio frequencies F1~F3 are assigned to radio base station 2, and identical radio frequencies F1~F3 are assigned to the adjacent radio base station 3. The radio base stations 2, 3 are each provided with transceivers (TRX#1, TRX#2, TRX#3) for corresponding ones of the radio frequencies F1, F2, F3, respectively. The radio frequency F1 assigned to radio base station 2 in time slot #2 is a control channel CCH, and the radio frequency F3 assigned to radio base station 3 in time slot #2 is a control channel CCH. The mobile station 1 is currently under the control of the radio base station 2 and is using the radio channel of frequency F2, time slot #0. The two radio channels (telecommunication channels) of frequency F3, time slots #0 and #2 are currently being used by a mobile station that is not shown.

The management table 6a provided in the radio base station control unit 6 has tables 6a-1, 6a-2 for respective ones of the radio base stations. The frequencies F1, F2 are assigned to the radio base station 2, and the frequency F3 is assigned to the radio base station 3. Accordingly, an entry to the effect that the frequency F3 is currently being used by the radio base station 3 is made in the row of frequency F3 in table 6a-1, and an entry to the effect that the frequencies F1, F2 are currently being used by the radio base station 2 is made in the rows of frequencies F1, F2 in table 6a-2.

If, under these conditions, the state of radio-wave reception at the mobile station 1 deteriorates owing to movement of the mobile station and it becomes necessary to switch the radio base station from the radio base station 2, which is currently communicating with the mobile station 1, to the adjacent radio base station 3 (that is, to hand over the mobile station 1 from base station 2 to base station 3), an idle channel will not exist in the new radio base station 3. This means that changeover of the radio channel for the mobile station 1 cannot be performed until an assignable radio channel (one of the radio channels of time slots #0, #1 of frequency F3) becomes idle. Unless an idle assignable radio channel becomes available, the quality of communication will fall below that stipulated and communication will be cut off.

SUMMARY OF THE INVENTION

Accordingly, an object of the present invention is to provide a radio channel assignment method in which handover is possible even if the new base station does not possess an idle channel.

Another object of the present invention is to provide a radio channel assignment method in which handover can be performed and the mobile station is capable of maintaining excellent communication quality even if the new base station does not possess an idle channel.

In accordance with the present invention, the foregoing object is attained by providing a radio channel assignment method in a TDMA-type mobile telecommunication system having a plurality of radio base stations to which common radio frequencies have been assigned, and a base station control unit for controlling each of the radio base stations, wherein radio frequencies are shared with radio base stations, each radio frequency is assigned as a radio channel, on a per time-slot basis, to a mobile station, and a radio channel is specified by the radio frequency and the time-slot characterized in that the base-station control unit: manages, with regard to each radio frequency, the number of a radio base station that is using this radio frequency, the number of a mobile station that is using this radio frequency in each time slot, and data indicating whether this radio frequency is a frequency that has been assigned for shared use with the radio base stations; determines, when it becomes necessary to hand over a mobile station currently communicating via a predetermined radio channel from a radio base station with which it is currently communicating to an adjacent radio base station, whether the frequency currently being used by the mobile station is a shared assigned frequency and whether this frequency has been assigned to another mobile station in another time slot; does not change the frequency used by the mobile station but changes over the radio base station using this frequency from the current radio base station to the adjacent radio base station when the frequency currently being used by the mobile station is a shared assigned frequency and this frequency has not been assigned to another mobile station in any other time slot; and performs handover by activating a radio channel of a prescribed time slot of the shared frequency at the adjacent radio base station.

In accordance with the present invention, the foregoing object is attained by providing a radio channel assignment method in a TDMA-type mobile telecommunication system having a plurality of radio base stations to which common radio frequencies have been assigned, and a base-station control unit for controlling each of the radio base stations, wherein radio frequencies are shared with radio base stations, each radio frequency is assigned as a radio channel, on a per time-slot basis, to a mobile station, and a radio channel is specified by the radio frequency and the time-slot, characterized in that the base-station control unit: manages, with regard to each radio frequency, the number of a radio base station that is using this radio frequency, the number of a mobile station that is using this radio frequency in each time slot, and data indicating whether this radio frequency is a frequency that has been assigned for shared use with the radio base stations; determines, when it becomes necessary to hand over a mobile station currently communicating via a predetermined radio channel from a radio base station with which it is currently communicating to an adjacent radio base station, whether the frequency currently being used by the mobile station is a shared assigned frequency and whether this frequency has been assigned to another mobile station in another time slot; investigates, when the frequency currently being used by the mobile station is a shared assigned frequency and this frequency has been assigned to other mobile station in another time slot, the condition of radio waves transmitted between this other mobile station and the adjacent radio base station and, if the condition of the radio waves is acceptable, performs handover without changing the frequency used by each mobile station but changing over the radio base station using this frequency from the current radio base station to the adjacent radio base station.

Other features and advantages of the present invention will be apparent from the following description taken in conjunction with the accompanying drawings.

BRIEF DESCRIPTION OF THE DRAWINGS

FIG. 6 is a diagram showing different contents of a management table;

FIG. 12 is a diagram for describing the message of a condition report 2;

FIG. 13 is a diagram for describing a condition report acknowledgment message;

FIG. 14 is a diagram for describing a handover radio channel set message;

FIG. 15 is a diagram for describing a change in the contents of a management table;

FIG. 18 is a diagram for describing a change in the contents of a management table;

FIG. 20 is a diagram for describing a base-station changeover notification message;

FIG. 21 is a diagram for describing base-station changeover notification acknowledgment message;

FIG. 24 is a diagram for describing a radio-state inquiry message;

FIG. 25 is a diagram for describing the message of a condition report 1;

Figure 33:
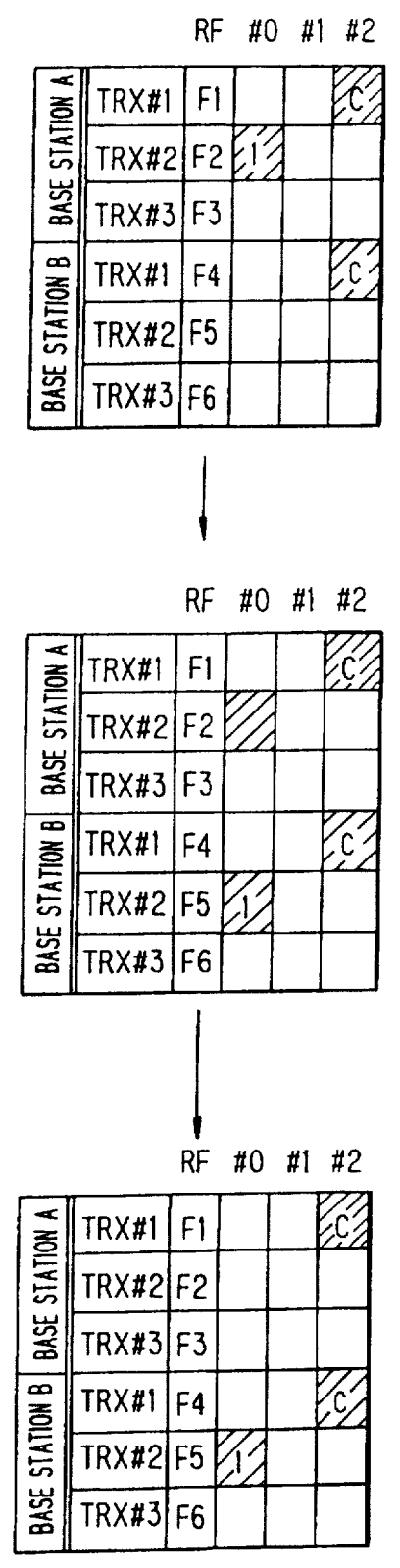

FIG. 33 is a diagram for describing a change in the content of a management table used in handover control.

DESCRIPTION OF THE PREFERRED EMBODIMENTS

(A) Overview of the invention

Figure 1:
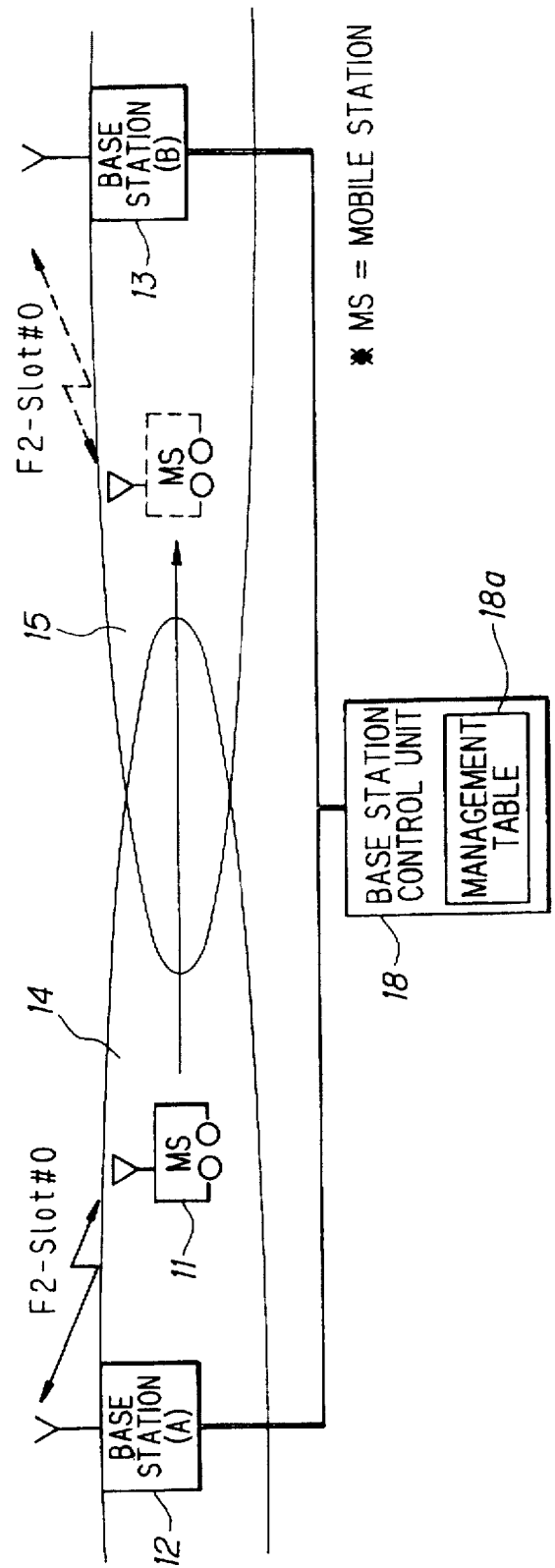
FIG. 1 is a diagram of system configuration for describing an overview of the present invention.
Figure 2:
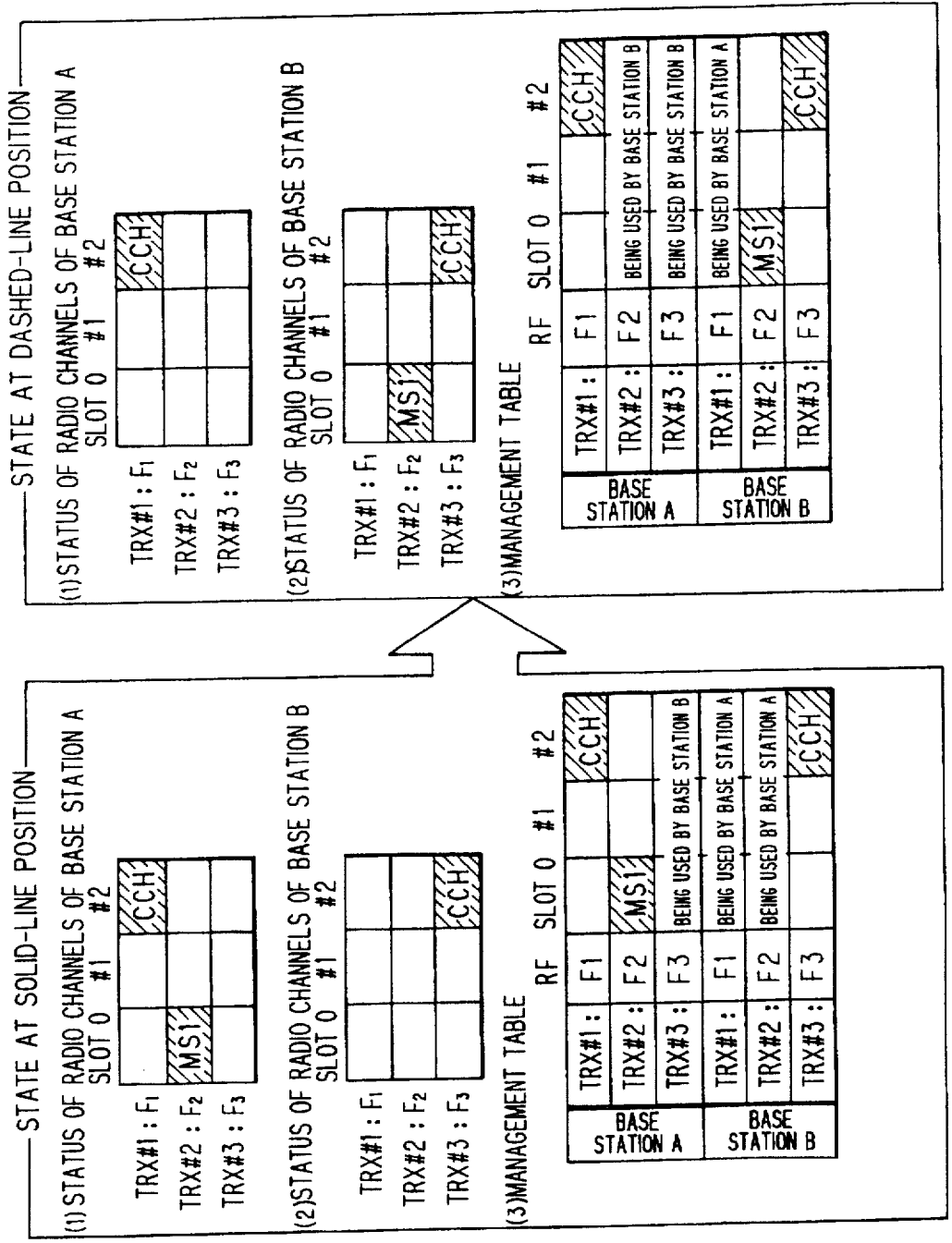
FIG. 2 is a diagram of the contents of a management table for describing an overview of the present invention.

FIGS. 1 and 2 are diagrams for describing an overview of the present invention. FIG. 1 shows the configuration of a mobile telecommunication system, and FIG. 2 illustrates the contents of a management table provided in a base-station control unit.

Shown in FIG. 1 are a mobile station 11 and adjacent radio base stations (A, B) 12, 13, each of which has been assigned shared frequencies F1, F2 and F3 and is provided with transceivers (TRX#1, TRX#2, TRX#3) for corresponding ones of the radio frequencies F1, F2, F3, respectively. Radio zones 14, 15 correspond to the radio base stations 12, 13, respectively. A radio base station control unit 18 has a management table 18a for managing the status of use of the radio channels in each radio base station. As shown in FIG. 2, the management table 18a is configured so that it is possible to identify, for each of the radio frequencies (F1~F3), (a) the number of the radio base station using the radio frequency, (b) the number of the mobile station using the radio frequency in each time slot, and (c) whether this radio frequency is one that has been assigned for shared use by the radio base stations.

In the radio base station 12, the radio channel of radio frequency F1, time slot #2 is the control channel CCH. In the radio base station 13, the radio channel of radio frequency F3, time slot #2 is the control channel CCH. The mobile station 11 is currently under the control of the radio base station 12, as indicated by the solid line in FIG. 1, and is using the radio channel of frequency F2, time slot #0. Under these conditions, the status of use of the radio channels of radio base stations 12, 13 and the contents of the management table 18a are as illustrated at (1), (2), (3) on the left side of FIG. 2.

The frequencies F1, F2 are assigned to the radio base station (base station A) 12, and the frequency F3 is assigned to the radio base station (base station B) 13. Accordingly, an entry to the effect that the frequencies F1, F2 are currently being used by the base station A is made in the rows of frequencies F1, F2 on the side of the radio base station B in management table 18a, and an entry to the effect that the frequency F3 is currently being used by the base station B is made in the row of frequency F3 on the side of the radio base station A in management table 18a.

When the mobile station 11 moves in the direction of the arrow under these conditions, the state of radio-wave reception at the mobile station 11 changes owing to movement of the mobile station and it becomes necessary to switch the radio base station from the radio base station 12, which is currently communicating with the mobile station 11, to the adjacent radio base station 13. In such case the radio base station control unit 18 refers to the management table 18a and checks to determine (a) whether the frequency F2 currently being used by the mobile station 11 is a shared assigned frequency and (b) whether this frequency has been assigned to another mobile station in another time slot. When the frequency F2 currently being used by the mobile station 11 is a shared assigned frequency and this frequency has not been assigned to another mobile station in any other time slot, the base station control unit 18 does not change the radio channel (the frequency used and the time slot to which the frequency has been allocated) of the mobile station 11, changes over the radio base station that is using the frequency F2 from the current radio base station 12 to the new radio base station 13 and instructs the new radio base station 13 to activate the radio channel (frequency F2, time slot #0) of the mobile station 11. As a result, at the moment the mobile station 11 moves to the position indicated by the dashed line in FIG. 1, the status of use of the radio channels of radio base stations 12, 13 and the contents of the management table 18a become as shown at (1), (2), (3) on the right side of FIG. 2.

The above represents first radio-channel changeover control of this invention.

Further, an arrangement can be adopted in which the base station control unit 18 does not change the frequency F2 used by the mobile station 11 but changes only the allocation time slot, thereby changing the radio channel of the mobile station 11. In such case the base station control unit 18 changes over the radio base station that is using the frequency F2 from the current radio base station 12 to the new radio base station 13 and instructs the new radio base station 13 to activate the radio channel, to which the change has been made, of mobile station 11.

The above represents second radio-channel changeover control of this invention.

Further, an arrangement can be adopted in which, when it becomes necessary for the base station control unit 18 to effect handover of the mobile station from the currently communicating radio base station 12 to the adjacent radio base station 13, the base station control unit 18 checks to see whether there is a newly assignable idle radio channel in the new radio base station 13 and the base station control unit 18 performs handover by assigning the idle channel to the mobile station as the radio channel if the idle channel exists or by changing over the radio base station using the frequency F2 of the mobile station from the current radio base station 12 to the new radio base station 13 if an idle channel does not exist.

The above represents third radio-channel changeover control of this invention.

In accordance with the first through third radio-channel changeover control described above, handover is made possible, even if the new radio base station 13 does not possess an idle channel, by changing the base station using frequency F2 to the new base station. As a result, the mobile station 11 is capable of maintaining excellent communication quality.

Further, when it becomes necessary to implement handover from the currently communicating radio base station 12 to the adjacent radio base station 13, the mobile station 11 requests the base station control unit 18 to execute handover without changing the current radio channel. As a result, even if an idle channel does exists in the new radio base station 13, handover is implemented in accordance with the first or second radio-channel changeover control without using the idle channel. If this arrangement is adopted, ordinary handover is possible and it is also possible to carry out handover by changing over the base station that transmits the radio frequency (the carrier). The result is an increase in selection patterns in which handover is possible in the system, thus improving service in a mobile telecommunication system.

Further, after the mobile station 11 is handed over to the new radio base station 13, the latter notifies the mobile station 11 of the fact that the base station has been switched. This makes it possible for the user to recognize, by a man-machine interface, the base station to which the mobile station is currently connected. This also improves service in a mobile telecommunication system.

Furthermore, when it becomes necessary to change over the base station from the currently communicating radio base station 12 to the adjacent radio base station 13, the base station control unit 18 refers to the management table 18a and checks to determine (a) whether the frequency F2 currently being used by the mobile station 11 is a shared assigned frequency and (b) whether this frequency has been assigned to other mobile station in another time slot. When the frequency F2 currently being used by the mobile station 11 is a shared assigned frequency and this frequency has been assigned to other mobile station in another time slot, the base station control unit 18 detects the condition of the radio waves transmitted between this other mobile station and the new radio base station 13. If the condition of the radio waves is acceptable, the base station control unit 18 switches over the radio base station using the frequency F2 from the current radio base station 12 to the new radio base station 13 without changing the radio channels of each mobile station, and instructs the new radio base station 13 to activate the radio channel of each mobile station. As a result, handover is possible even if an idle channel does not exist in the new radio base station 13 and even if the frequency used by the mobile station 11 has been assigned to another mobile station in another time slot. The mobile station 11 can therefore maintain excellent communication quality. In this instance, there is no deterioration in the communication quality of the other mobile stations as well.

(B) Configuration of mobile telecommunication system

Figure 3:
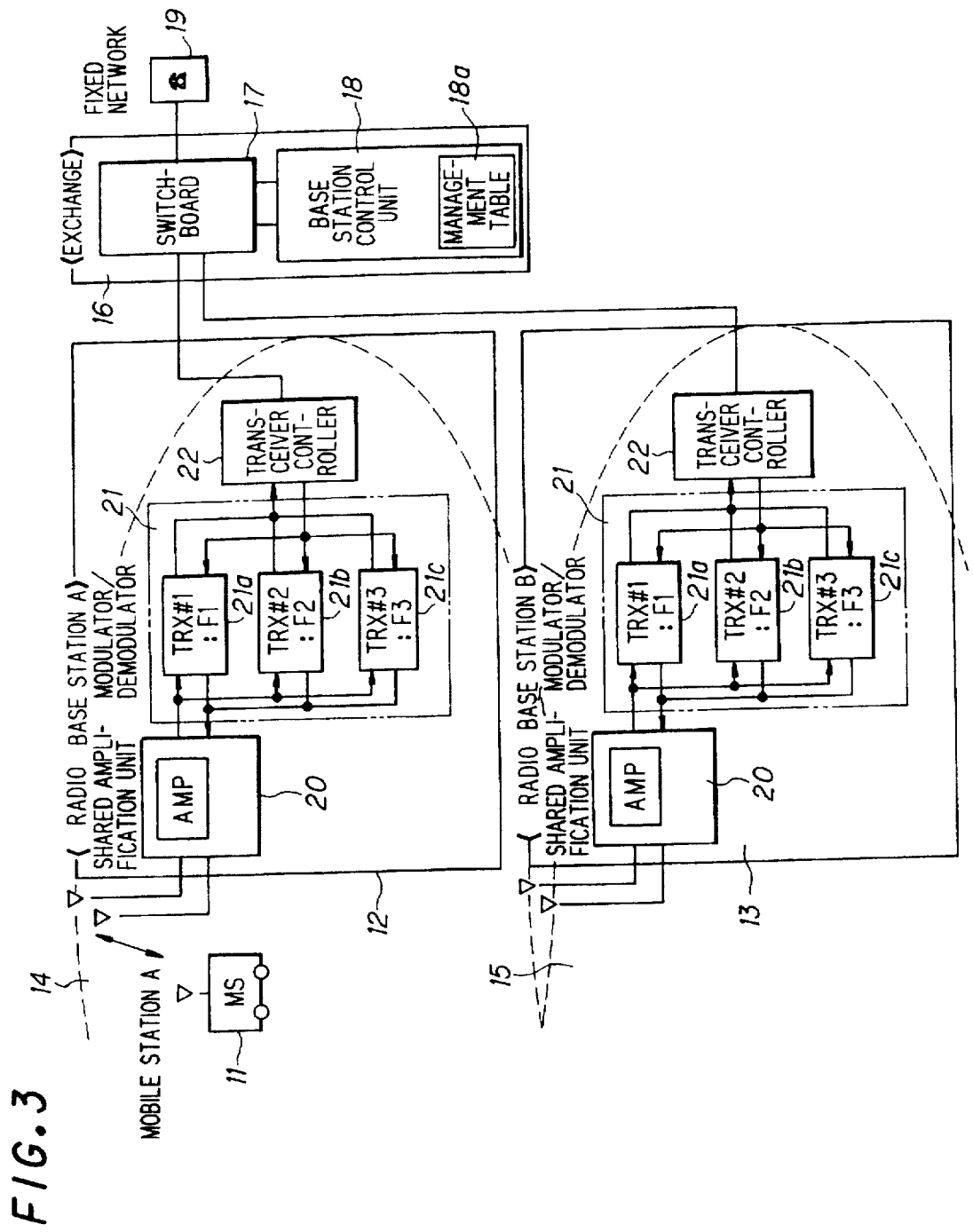
FIG. 3 is a block diagram showing the configuration of a mobile telecommunication system.

FIG. 3 is a block diagram showing the configuration of a mobile telecommunication system (digital car telephone system) comprising a plurality of TDMA-type radio zones.

Shown in FIG. 3 are the mobile station (MS) 11 and the adjacent radio base stations (A, B) 12, 13, each of which has been assigned shared frequencies F1, F2 and F3. Radio zones 14, 15 correspond to the radio base stations 12, 13, respectively. The radio base stations 12, 13 wirelessly communicate with the mobile station in the radio zones 14, 15, respectively. The mobile station 11 is currently in the radio zone 14 of radio base station 12. When movement of the mobile station 11 causes a change in the state of reception and a changeover is made from the radio base station 12 to the radio base station 13, the radio base station 12 is referred to as the "original radio base station" and the radio base station 13 is referred to as the "new radio base station".

An exchange 16 is connected to the radio base station 12 and 13 and includes a switchboard 17 and the base station control unit 18. The radio base station control unit 18 has the management table 18a for managing the status of use of the radio channels in each radio base station. The management table 18a is configured so that it is possible to identify, for each of the radio frequencies (F1–F3), (a) the number of the radio base station using the radio frequency, (b) the number of the mobile station using the radio frequency in each time slot, and (c) whether this radio frequency is one that has been assigned for shared use by the radio base stations. Numeral 19 denotes a fixed network such as public telephone network.

The radio base stations 12 and 13 each include a shared amplification unit 20 having a high-frequency amplifier AMP, a modulator/demodulator 21 provided with transceivers (TRX#1, TRX#2, TRX#3) for corresponding ones of the radio frequencies F1, F2, F3, respectively, and a transceiver controller 22 for controlling the sending and receiving of data between the exchange 16 and the mobile station 11.

(C) Construction of mobile station

Figure 4:
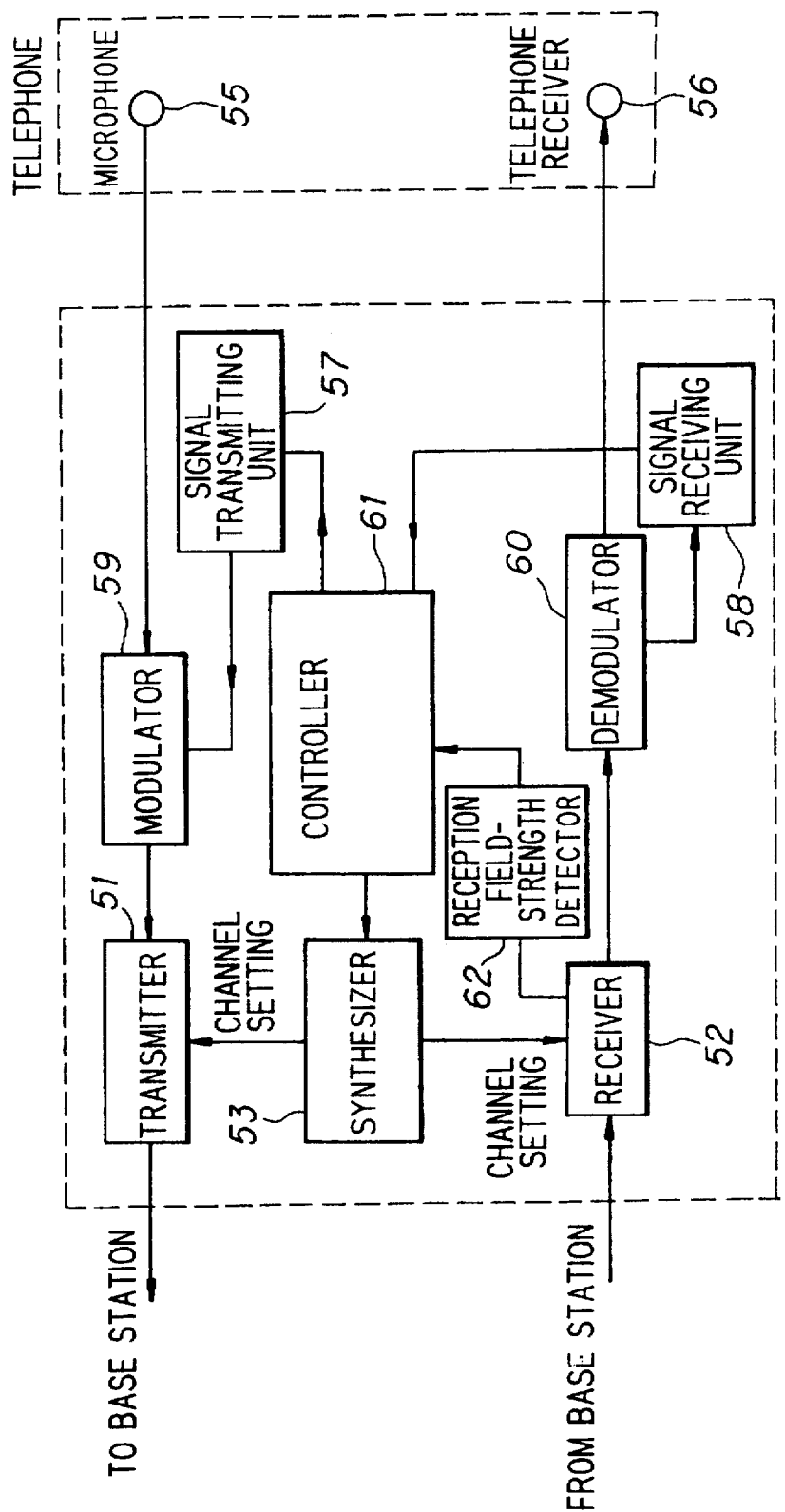
FIG. 4 is a block diagram showing the construction of a mobile station.

FIG. 4 is a block diagram showing the construction of the mobile station 11. The mobile station includes a transmitter 51, a receiver 52, a synthesizer 53 for outputting a predetermined frequency signal conforming to a control channel or telecommunication channel, a telephone microphone 55 and receiver 56, a signal transmitting unit 57 for outputting data sent to a radio base station, a signal receiving unit 58 for extracting and outputting data sent from a radio base station via a control channel, a modulator 59 for modulating a signal that has entered from the microphone 55 or signal transmitting unit 57, a demodulator 60 for demodulating a signal sent from a radio base station, a controller 61 comprising a microcomputer or the like for performing connection control such as call-origination control or incoming-call control, and a reception field-strength detector 62 for detecting the reception field strength of received radio waves.

The controller 61 usually sets the synthesizer 53 to the control channel and then establishes a waiting state. At origination of an outgoing call, the controller 61 transmits a connect request signal from the signal transmitting unit 57 by way of the control channel and receives an answer signal from a radio base station by the signal receiving unit 58. If a channel designation signal is received from the radio base station, the controller 61 sets the synthesizer 53 so as to effect tuning to the designated telecommunication channel (radio channel). The user then talks to the communicating party via this telecommunication channel. Furthermore, while the communication is in progress, the controller 61 receives radio waves from base stations in the vicinity and transmits the reception field strength thereof to the radio base station with which it is currently communicating. If a channel designation signal is received from a radio base station, the controller 61 sets the synthesizer 53 (implements handover) to the designated telecommunication channel. If, at arrival of an incoming call, the controller 61 receives a channel designation signal from a radio base station via the control channel, the controller 61 sets the synthesizer 53 to the designated telecommunication channel. The user then talks to the communicating party via this telecommunication channel.

(D) Status of use of radio channels and contents of management table

Figure 5:
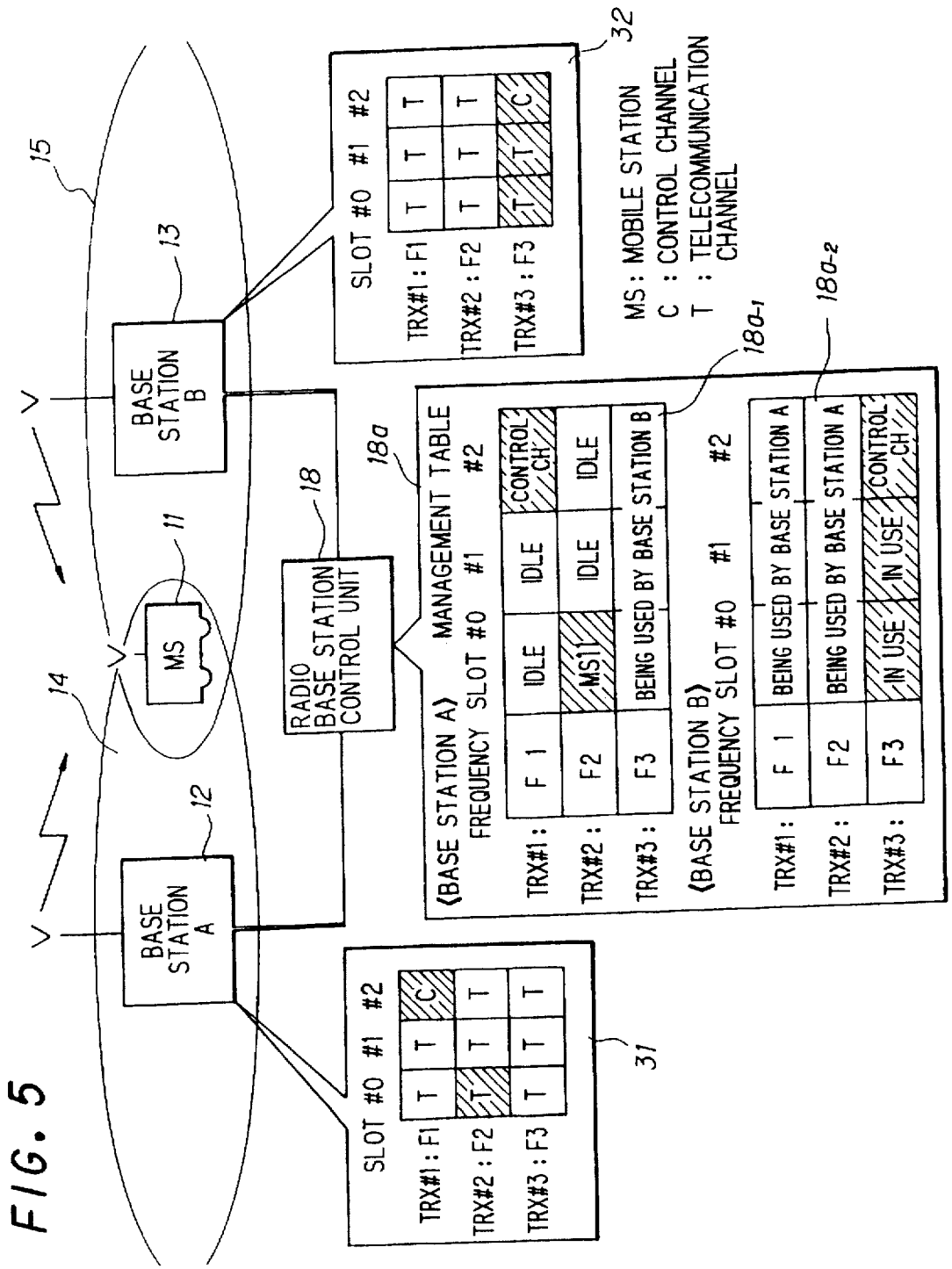
FIG. 5 is a diagram for describing status of use of radio channels in each base station as well as the contents of the management table.

FIG. 5 is a diagram for describing the status of use of the radio channels of each base station as well as the contents of the management table 18a. Elements identical with those shown in FIG. 3 are designated by like reference characters.

In the radio base station 12, the radio channel of radio frequency F1, time slot #2 is the control channel CCH. In the radio base station 13, the radio channel of radio frequency F3, time slot #2 is the control channel CCH. The mobile station 11 is currently under the control of the radio base station 12 and is using the radio channel of frequency F2, time slot #0 to communicate with another mobile station or with an in-building telephone terminal. Furthermore, a mobile station (not shown) in the radio zone 15 is using the radio channels of frequency F3, time slot #0 and frequency F3, time slot #1 to perform communication.

Under these conditions, the status of the radio channels of radio base station 12 is as shown in box 31, and the status of the radio channels of radio base station 13 is as shown in box 32, where C represents the control channel, T the telecommunication channel (radio channel) and MS the number of the mobile station.

The base station control unit 18 has tables 18a-1, 18a-2 for respective ones of the radio base stations. For each of the time slots #0–#2 of frequencies F1–F3, each table has an entry of information indicating whether the slot is idle or in use (if the slot is in use, the number of the particular mobile station is written in the slot) or whether the adjacent radio base station is currently using the frequency. Here the radio base station (base station A) 12 is using the frequencies F1, F2 and the radio base station (base station B) 13 is using the frequency F3. Accordingly, an entry to the effect that the frequency F3 is currently being used by the base station B is made in the row of frequency F3 in table 18a-1, and an entry to the effect that the frequencies F1, F2 are currently being used by the base station A is made in the rows of frequencies F1, F2 of table 18a-2. The radio channels indicated by the shading are in use.

The content of the management table 18a is not limited to that shown in FIG. 5. Another example of possible content is shown in FIG. 6. In accordance with this management table, it is possible to readily identify, for each of the radio frequencies (F1-F3), (a) whether the radio frequency is one that has been assigned for shared use by each of the radio base stations, (b) the number of the radio base station using the radio frequency, and (c) the number of the mobile station using the radio frequency in each time slot.

(E) Radio channel assignment control according to the invention

If, in a case where the status of the radio channels is as shown in FIG. 5, the condition of the radio-wave reception at the mobile station 11 changes owing to movement of the mobile station and it becomes necessary to switch the base station from the currently communicating radio base station 12 to the adjacent radio base station 13, an idle channel will not exist in the radio base station 13, as evident from table 18a-2. In such case, handover is performed upon assigning the radio channels through the method of the present invention, which will now be described.

(a) First radio-channel changeover control method at time of handover

Figure 7:
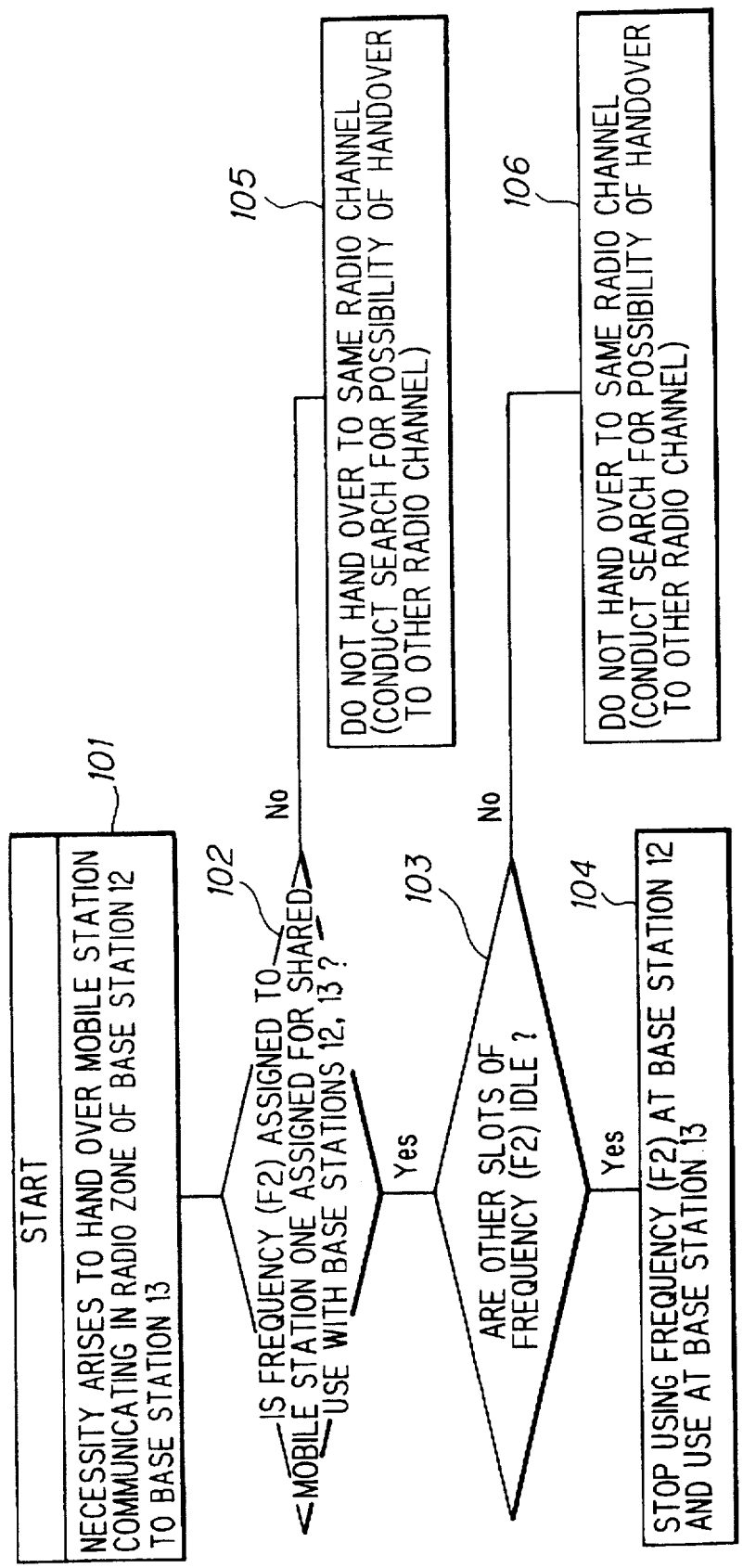
FIG. 7 is first radio-channel assignment processing flow at time of handover.

FIG. 7 is first radio-channel assignment processing flow executed at handover.

First, at step 101, a situation arises in which the condition of radio-wave reception at the mobile station 11 changes during communication in the radio zone 14 of radio base station 12, as a result of which it becomes necessary to hand over the mobile station 11 to the adjacent radio base station 13. When this happens, the mobile station 11 requests the base station control unit 18 for handover.

In response to the handover request, the base station control unit 18 refers to the management table 18a to determine whether the frequency F2 (frequency F2, time slot #0) of the radio channel currently being used by the mobile station 11 has been assigned for shared use by the radio base stations 12 and 13 (step 102). If the frequency is one assigned for shared use ("YES" at step 102), the base station control unit 18 refers to the management table 18a to determine whether all radio channels in the other time slots #1, #2 of frequency F2 are idle (step 103). If the channels are idle ("YES" at step 103), the base station control unit 18 switches over the base station using the frequency F2 from the current radio base station 12 to the new radio base station 13 and does not change the radio channel assigned thus far to the mobile station 11. This radio channel is kept as the assigned radio channel even after handover is performed (step 104). The base station control unit 18 then instructs the new radio base station 13 to activate this radio channel decided upon. In response, the new radio base station 13 activates the designated radio channel and exchanges synchronizing data and communication bursts with the mobile station 11.

If the frequency F2 is not one that has been assigned for shared use by each of the radio base stations ("NO" at step 102), then the mobile station cannot be handed over to the same radio channel. Accordingly, it is subsequently determined whether a changeover to another radio channel can be made, and handover control is continued (step 105).

If it is found at step 103 that at least one of the radio channels in the other time slots #1, #2 of frequency F2 is being used by another mobile station ("NO" at step 103), handover to the same radio channel cannot be carried out. Accordingly, it is subsequently determined whether a changeover to another radio channel can be made, and handover control is continued (step 106).

(b) Second radio-channel changeover control method at time of handover

Figure 8:
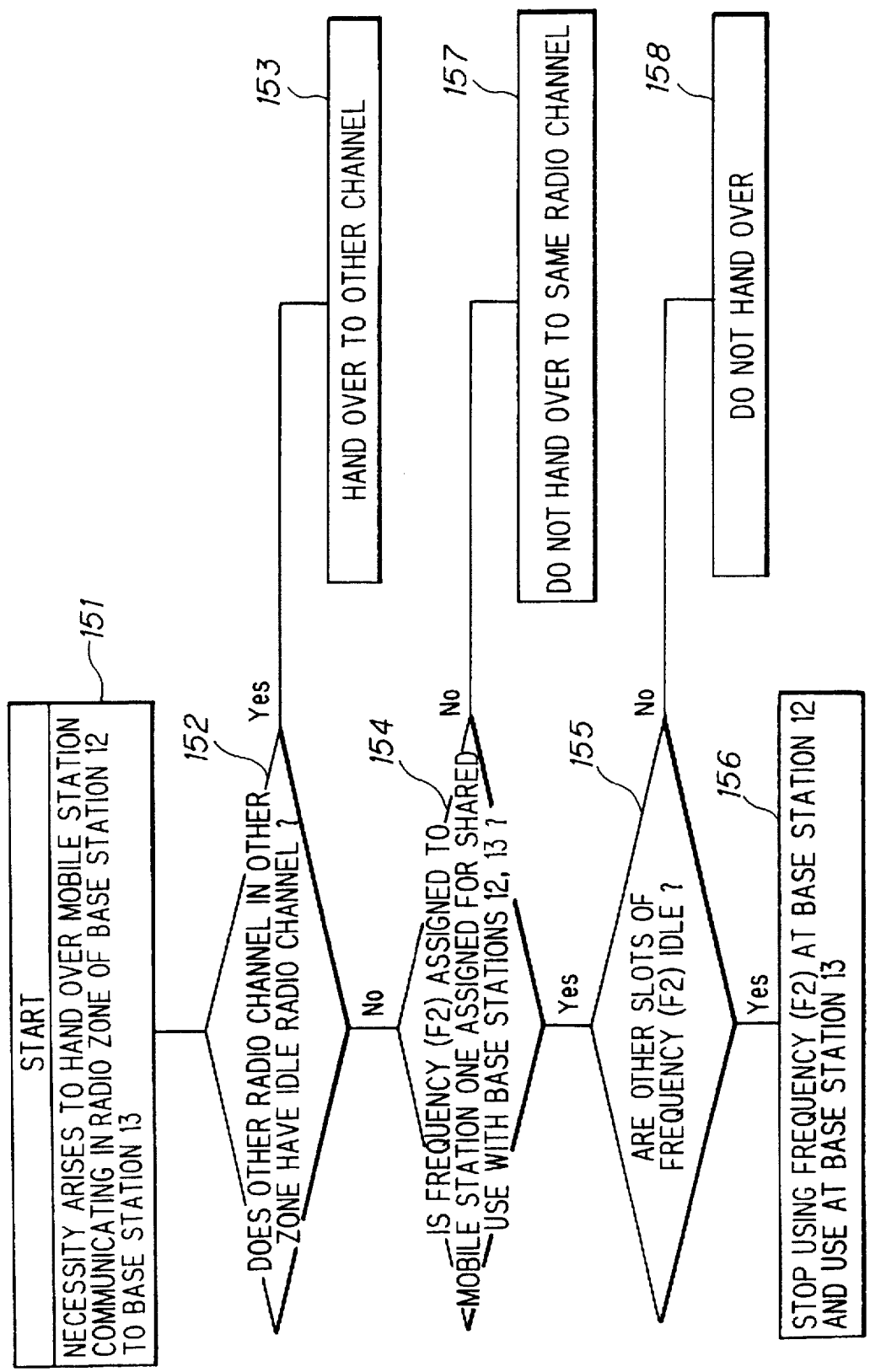
FIG. 8 is second radio-channel assignment processing flow at time of handover.

FIG. 8 is second radio-channel assignment processing flow executed at handover. This is a case where an idle channel exists in the new radio base station 13 at the time of handover.

First, at step 151, a situation arises in which the condition of radio-wave reception at the mobile station 11 changes during communication in the radio zone 14 of radio base station 12, as a result of which it becomes necessary to hand over the mobile station 11 to the adjacent radio base station 13. When this happens, the radio base station (the new radio base station) 12 instructs the base station control unit 18 to make it the new radio base station and requests the base station control unit 18 for handover.

Figure 32:
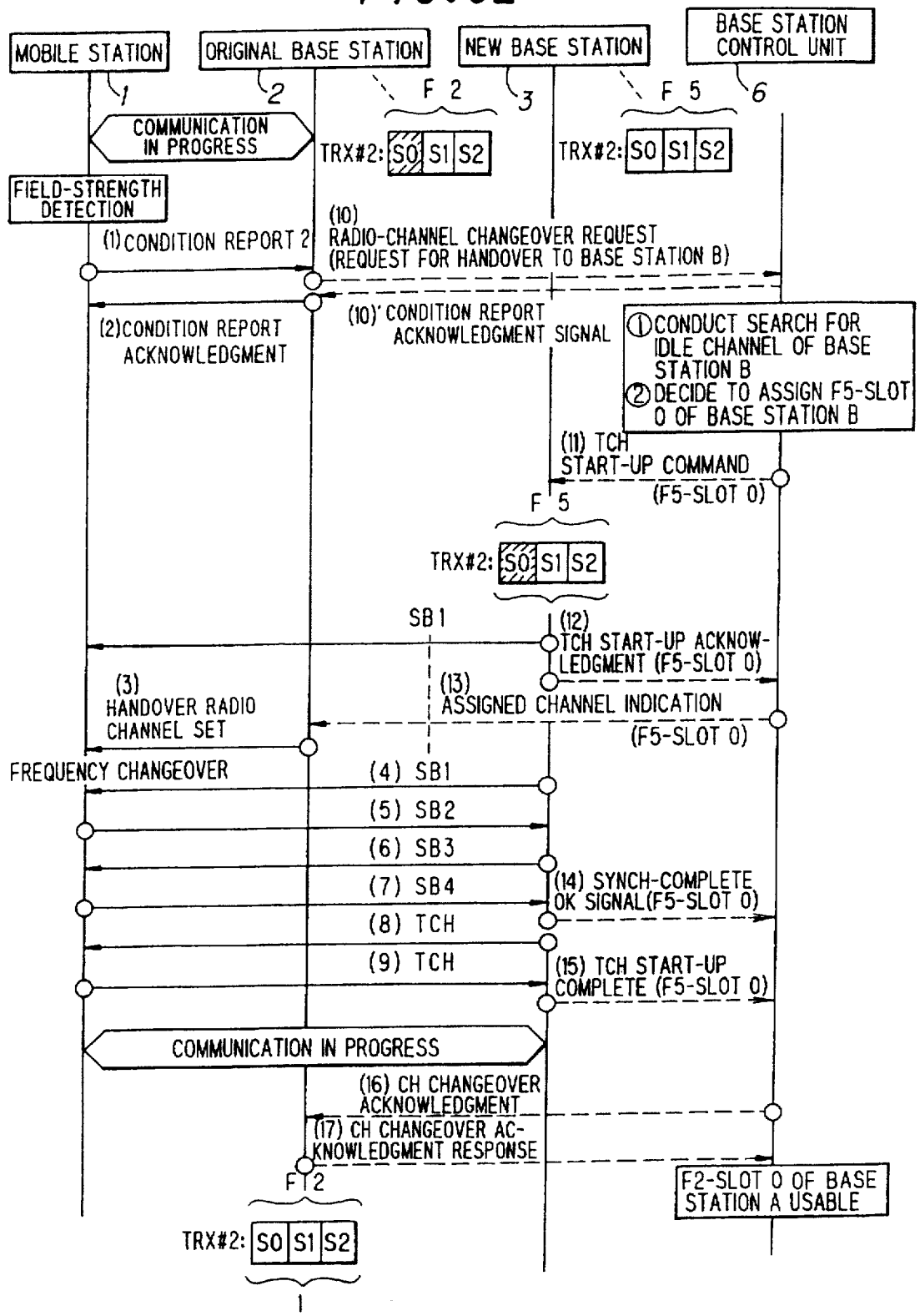
FIG. 32 shows a handover control sequence according to the prior art.
Figure 34:
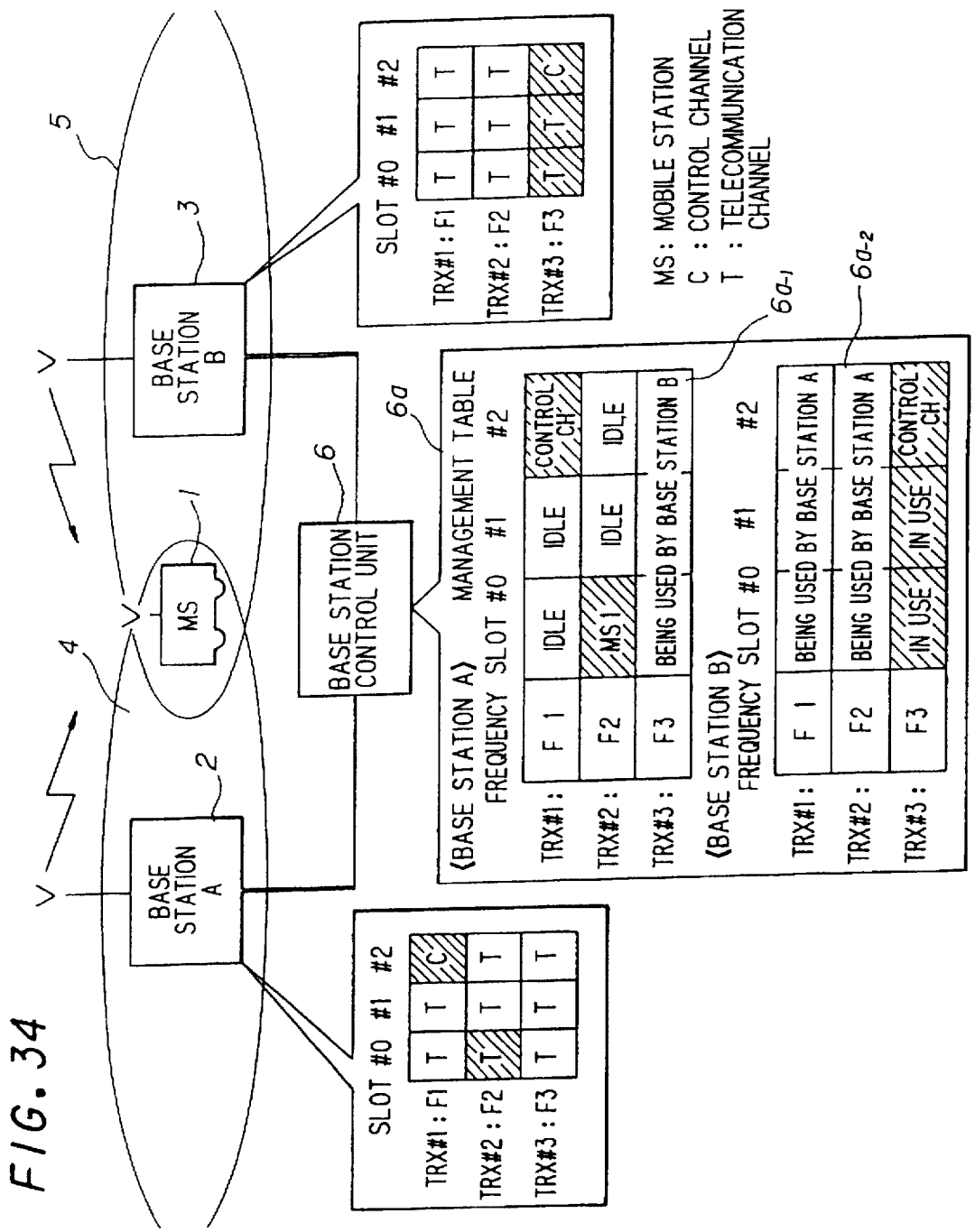
FIG. 34 is a diagram showing the configuration of a mobile radio telecommunication system in a case where the same frequencies have been assigned to adjacent base stations.

In response to the handover request, the base station control unit 18 refers to the management table 18a to determine whether the new radio base station has an idle channel (step 152). If an idle channel exists ("YES" at step 152), then the idle channel is assigned to the mobile station to execute handover in accordance with the conventional control sequence shown in FIG. 32 (step 153).

If an idle channel does not exist ("NO" at step 152), then the base station control unit 18 refers to the management table 18a to determine whether the frequency F2 of the radio channel (frequency F2, time slot #0) currently being used by the mobile station 11 has been assigned for common use by the radio base stations 12, 13 (step 154). If the frequency is one assigned for shared use ("YES" at step 154), the base station control unit 18 refers to the management table 18a to determine whether all radio channels in the other time slots #1, #2 of frequency F2 are idle (step 155). If the channels are idle ("YES" at step 155), the base station control unit 18 switches over the base station using the frequency F2 from the current radio base station 12 to the new radio base station 13 and does not change the radio channel that was assigned to the mobile station 11. This radio channel is kept as the assigned radio channel even after handover is performed (step 156). The base station control unit 18 then instructs the new radio base station 13 to activate the radio channel of the mobile station 11. In response, the new radio base station 13 activates the designated radio channel and exchanges synchronizing data and communication bursts with the mobile station 11.

If the frequency F2 is not one that has been assigned for shared use by each of the radio base stations ("NO" at step 154), then the mobile station cannot be handed over to the same radio channel. Accordingly, it is subsequently determined whether a changeover to another radio channel can be made, and handover control is continued (step 157).

If it is found at step 155 that at least one of the radio channels in the other time slots #1, #2 of frequency F2 is being used by another mobile station ("NO" at step 155), handover to the same radio channel cannot be carried out and the system waits for an idle channel to occur (step 158).

(c) Third radio-channel changeover control method at time of handover

Figure 9:
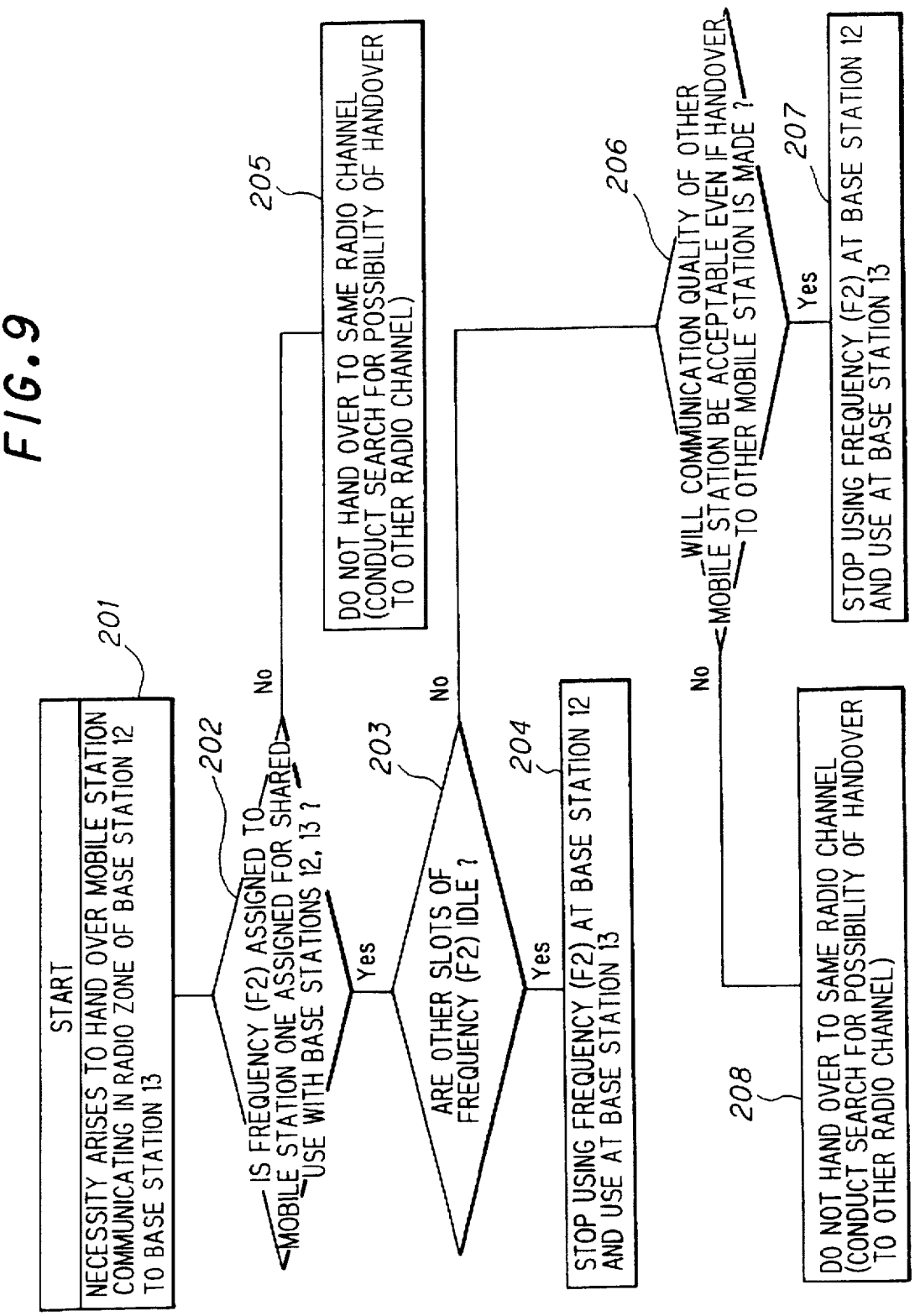
FIG. 9 is third radio-channel assignment processing flow at time of handover.

FIG. 9 is third radio-channel assignment processing flow executed at handover. This is a case where the radio channel of another time slot of frequency F2 that was being used by the mobile station 11 to be handed over is currently being used by another mobile station.

First, at step 201, a situation arises in which the condition of radio-wave reception at the mobile station 11 changes during communication in the radio zone 14 of radio base station 12, as a result of which it becomes necessary to hand over the mobile station 11 to the adjacent radio base station 13. When this happens, the mobile station 11 requests the base station control unit 18 for handover.

In response to the handover request, the base station control unit 18 refers to the management table 18a to determine whether the frequency F2 (frequency F2, time slot #0) of the radio channel currently being used by the mobile station 11 has been assigned for shared use by the radio base stations 12 and 13 (step 202). If the frequency is one assigned for shared use ("YES" at step 202), the base station control unit 18 refers to the management table 18a to determine whether all radio channels in the other time slots #1, #2 of frequency F2 are idle (step 203). If the radio channels of the other time slots are idle ("YES" at step 203), the base station control unit 18 switches over the base station using the frequency F2 from the current radio base station 12 to the new radio base station 13 and does not change the radio channel that was assigned to the mobile station 11. This radio channel is kept as the assigned radio channel even after handover is performed (step 204). The base station control unit 18 then instructs the new radio base station 13 to activate this radio channel of the mobile station. In response, the new radio base station 13 activates the designated radio channel and exchanges synchronizing data and communication bursts with the mobile station 11.

If the frequency F2 is not one that has been assigned for shared use by each of the radio base stations ("NO" at step 202), then the mobile station cannot be handed over to the same radio channel. Accordingly, it is subsequently determined whether a changeover to another radio channel can be made, and handover control is continued (step 205).

If it is found at step 203 that one of the radio channels in the other time slots #1, #2 of frequency F2 is currently being used by the other mobile station ("NO" at step 255), then the base station control unit 18 determines whether the communication quality of this other mobile station will be still be acceptable even if this mobile station is handed over (step 206). More specifically, the base station control unit 18 checks the reception level of the signal which this other mobile station receives from the new radio base station 13. If the reception level is satisfactory (e.g., if the reception level is higher than a set level), then the base station control unit 18 switches over the radio base station using the frequency F2 from the current radio base station 12 to the new radio base station 13 and does not change the radio channels that were assigned to the mobile station 11 and to the other mobile station. These radio channels are kept as the assigned radio channels even after handover is performed (step 207). The base station control unit 18 then instructs the new radio base station 13 to activate the radio channel of each mobile station. In response, the new radio base station 13 activates each of the designated radio channels and exchanges synchronizing data and communication bursts with the mobile station 11 and with the other mobile station as well.

However, if the reception level of the signal being sent from the other mobile station is below the set level ("NO" at step 206), then handover to the same radio channel cannot be carried out. Accordingly, it is subsequently determined whether a changeover to another radio channel can be made, and handover control is continued (step 208).

(d) Fourth radio-channel changeover control method at time of handover

Figure 10:
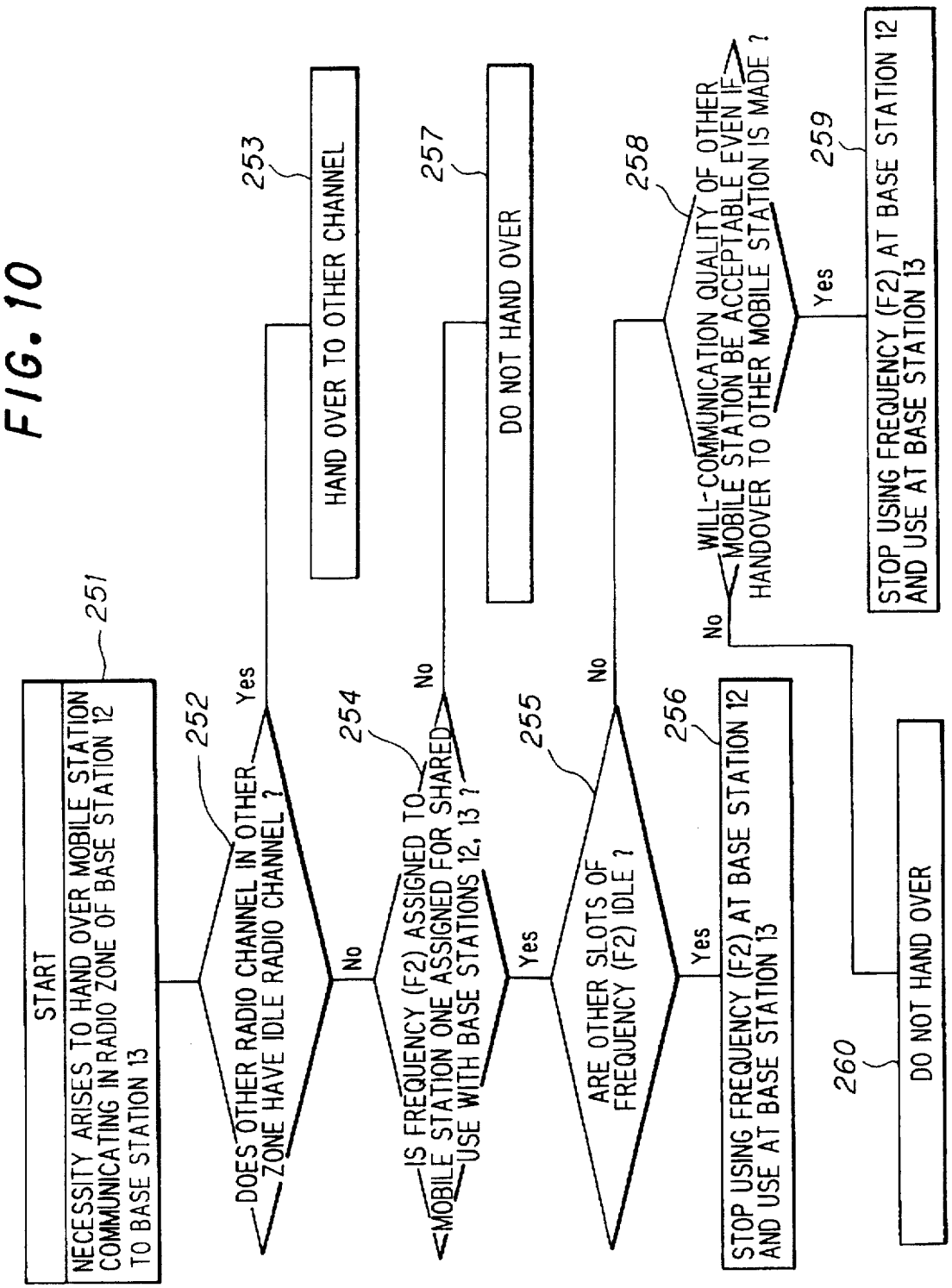
FIG. 10 is fourth radio-channel assignment processing flow at time of handover.

FIG. 10 is fourth radio-channel assignment processing flow executed at handover. This is a combination of the second and third control methods.

First, at step 251, a situation arises in which the condition of radio-wave reception at the mobile station 11 changes during communication in the radio zone 14 of radio base station 12, as a result of which it becomes necessary to hand over the mobile station 11 to the adjacent radio base station 13. When this happens, the mobile station 11 requests the base station control unit 18 to implement handover.

In response to the handover request, the base station control unit 18 refers to the management table 18a to determine whether the new radio base station has an idle channel (step 252). If an idle channel exists ("YES" at step 252), then the idle channel is assigned to the mobile station to execute handover in accordance with the conventional control sequence (step 253).

If an idle channel does not exist ("NO" at step 252), then the base station control unit 18 refers to the management table 18a to determine whether the frequency F2 of the radio channel (frequency F2, time slot #0) currently being used by the mobile station 11 has been assigned for common use by the radio base stations 12, 13 (step 254). If the frequency is one assigned for shared use ("YES" at step 254), the base station control unit 18 refers to the management table 18a to determine whether all radio channels in the other time slots #1, #2 of frequency F2 are idle (step 255). If the radio channels in the other time slots are all idle ("YES" at step 255), the base station control unit 18 switches over the base station using the frequency F2 from the current radio base station 12 to the new radio base station 13 and does not change the radio channel that was assigned to the mobile station 11. This radio channel is kept as the assigned radio channel even after handover is performed (step 256). The base station control unit 18 then instructs the new radio base station 13 to activate the radio channel of the mobile station 11. In response, the new radio base station 13 activates the designated radio channel and exchanges synchronizing data and communication bursts with the mobile station 11.

If the frequency F2 is not one that has been assigned for shared use by each of the radio base stations ("NO" at step 254), then the mobile station cannot be handed over and the system waits for an idle channel (step 257).

If it is found at step 255 that one of the radio channels in the other time slots #1, #2 of frequency F2 is currently being used by the other mobile station ("NO" at step 255), then the base station control unit 18 determines whether the communication quality of this other mobile station will be still be acceptable even if this mobile station is handed over (step 206). More specifically, the base station control unit 18 checks the reception level of the signal which this other mobile station receives from the new radio base station 13. If the reception level is satisfactory (e.g., if the reception level is higher than a set level), then the base station control unit 18 switches over the radio base station using the frequency F2 from the current radio base station 12 to the new radio base station 13 and does not change the radio channels that were assigned to the mobile station 11 and to the other mobile station. These radio channels are kept as the assigned radio channels even after handover is performed (step 259). The base station control unit 18 then instructs the new radio base station 13 to activate the radio channel of each mobile station. In response, the new radio base station 13 activates each of the designated radio channels and exchanges synchronizing data and communication bursts with the mobile station 11 and with the other mobile station as well.

However, if the reception level of the signal being sent from the other mobile station is below the set level ("NO" at step 258), then handover to the same radio channel cannot be carried out. Accordingly, it is subsequently determined whether a changeover to another radio channel can be made, and handover control is continued (step 260).

Figure 11:
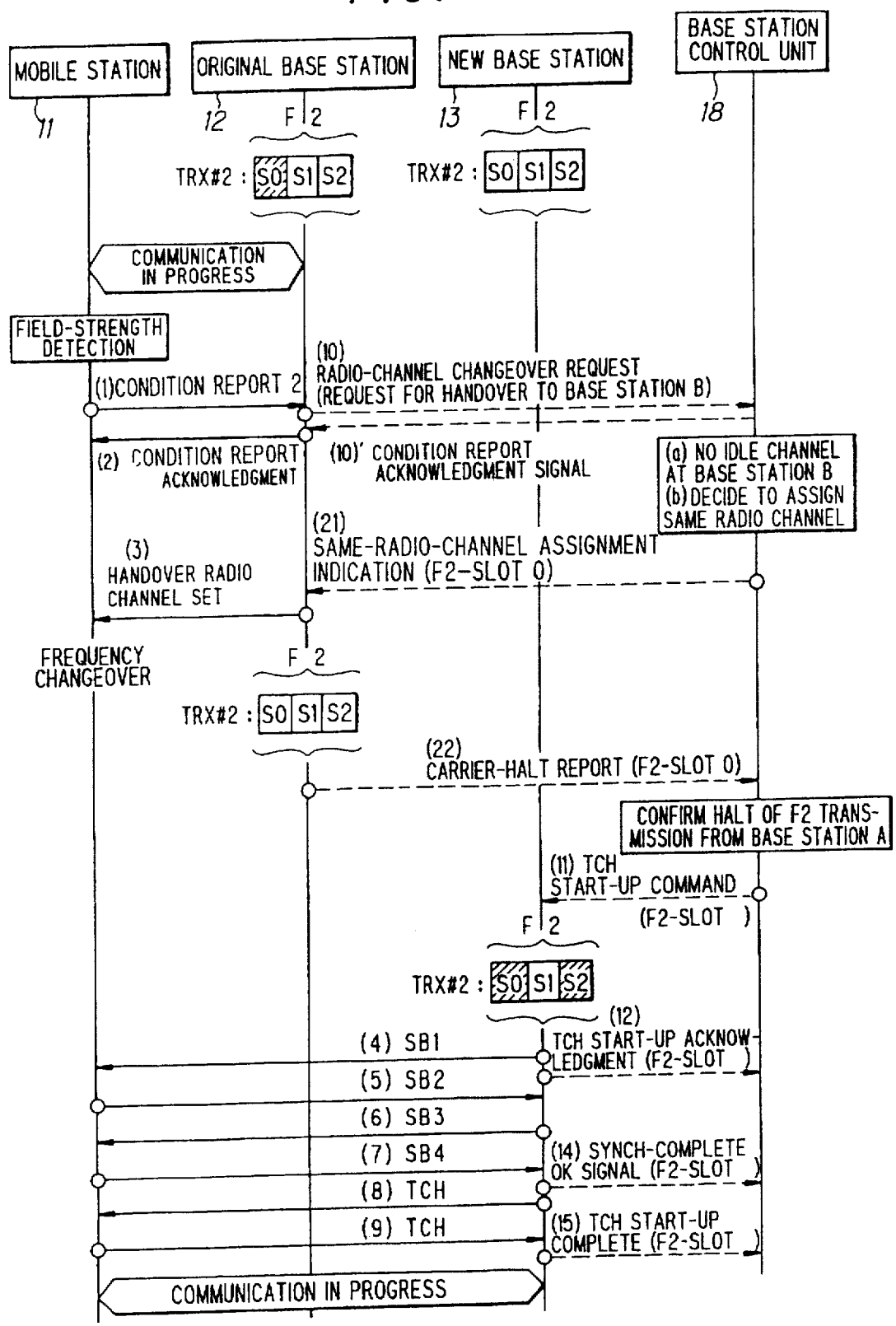
FIG. 11 shows a first handover control sequence.

(F) Handover control sequence (a) First handover control sequence (a-1) Description of signals FIG. 11 is a diagram for describing a first handover control sequence according to the present invention. Here it is assumed that the status of the radio channels is as shown in FIG. 5, that it has become necessary to switch over the base station from the radio base station (original radio base station) 12 currently communicating to the adjacent radio base station (new radio base station) 13 owing to a change in the condition of radio-wave reception at the mobile station 11 due to movement thereof, that there are no idle channels at the new radio base station 13 at this time and that a radio channel the same as that employed thus far has been assigned to the mobile station 11.

In FIG. 11, (1) is a "condition report 2" message, namely a message from the mobile station for reporting the state of reception at the mobile station (the reception field strength of the radio waves received from peripheral radio base stations) to the radio base station 12 and for simultaneously requesting handover. As shown in FIG. 12, the message (1) of "condition report 2" includes message type, reception level, selected number N of radio zones, and combinations of reception levels from N-number of base stations and control channel numbers. In FIG. 12, "upward direction" means direction from the mobile station to the network. Upon receiving this message, the radio base station 12 transmits a radio-channel handover request to the radio base station control unit 18.

Next, (2) is a condition report acknowledgment message having a format shown in FIG. 13, namely a message sent in the downward direction from the radio base station 12 to the mobile station 11 to acknowledge reception of the message of condition report 2. Next, (3) is a handover radio channel set message which indicates, to the mobile station, the radio channel to which a changeover is to be made (i.e., a "handover" radio channel). As shown in FIG. 14, the message (3) includes message type, the frequency code of the handover radio channel, the time slot number, etc. Further, (4) through (7) are synchronizing bursts SB1 through SB4, namely signals exchanged between the new base station 13 and the mobile station 11 in order to establish frame synchronization. A downward communication burst (8) and an upward communication burst (9) transfer user information and a user-information control signal, e.g., audio and facsimile information, etc. In FIG. 14, "downward direction" means direction from the network to the mobile station.

A radio-channel changeover request signal (10) notifies the radio base station control unit 18 of the fact that handover has been requested. Upon receiving the message (1) of the condition report 2 from the mobile station 11, the radio base station 12 notifies the base station control unit 18 of the handover request. A condition report acknowledgment signal (10)' from the base station control unit 18 notifies the radio base station 12 of reception of the radio-channel changeover request signal.

A same-radio-channel assignment indication signal (21) is sent from the base station control unit 18 to the original radio base station 12 to (a) instruct the radio base station 12 to assign a radio channel and (b) halt transmission of this radio channel immediately after sending the mobile station 11 the handover radio channel set message (3). A carrier-halt report signal (22) is a signal by which the original radio base station 12 reports to the base station control unit 18 the fact that transmission of the designated radio channel has been halted.

Further, (11) is a TCH start-up command signal (a radio channel start-up command signal). More specifically, this is a signal by which the radio base station control unit 18 decides upon a handover radio channel based upon the radio-channel changeover request signal (10) and instructs the new base station 13 to activate the above-mentioned radio channel. A TCH start-up acknowledgment signal (12) is a signal by which the new base station 13 reports, to the radio base station control unit 18, the fact that the TCH (radio channel) whose activation has been commanded by the TCH start-up command signal (11) has actually started up.

A synchronization-complete OK signal (14) is a signal by which the radio base station control unit 18 is notified of the fact that the exchange of the synchronizing bursts (4)~(7) between the mobile station 11 and new base station 13 has been performed normally. A TCH start-up complete signal (15) is a signal by which the new base station 13 reports, to the radio base station control unit 18, the fact that the mobile station 11 has begun an exchange normally based upon the communication bursts.

(a-2) Handover control

Upon receiving the message (1) of condition report 2 from the mobile station 11, the original radio base station 12 notifies the base station control unit 18 [i.e., sends the radio-channel changeover request signal (10)].

Upon receiving the radio-channel changeover request signal (10) and deciding to implement handover, the base station control unit 18 refers to the management table 18a and searches for an assignable radio channel at the new radio base station 13 (the base station to which the mobile station is to be handed over). If there is no assignable radio channel at the new radio base station 13, the base station control unit 18 executes processing, in accordance with the flowchart of FIG. 7, for assigning the same radio channel. It should be noted that an arrangement may be adopted in which precedence is given to assignment of the same radio channel even in a case where an assignable idle radio channel exists at the new radio base station 13.

If, as a result of the processing of FIG. 7 for assigning the same radio channel, it is possible to assign the mobile station 11 a radio channel the same as that assigned to the mobile station until now, the base station control unit 18 sends the original radio base station 12 the same-radio-channel assignment indication signal (21).

Upon receiving the same-radio-channel assignment indication signal (21), the original radio base station 12 generates the handover radio channel set message (3) and transmits it to the mobile station 11. Further, the original radio base station 12 halts the transmission of this radio channel after sending the handover radio channel set message (3) and, by way of the carrier-halt report signal (22), reports to the base station control unit 18 the fact that the carrier has been halted.

Upon receiving the report of carrier shut-down by way of the carrier-halt report signal (22) from the original radio base station 12, the base station control unit 18 sends the TCH start-up command signal (11) to the new radio base station 13, thereby commanding the radio base station 13 to activate the radio channel (telecommunication channel) halted at the original radio base station 12. Upon receiving the TCH start-up command signal (11), the original radio base station 13 activates this radio channel, starts transmission of the synchronizing burst SB1 and notifies the base station control unit 18, by way of the TCH start-up acknowledgment signal (12), of the fact that the telecommunication channel has been activated.

When the mobile station 11 receives the handover radio channel set message (3), the mobile station changes over the frequency (though it is unnecessary to do so in actuality) in accordance with the message information and waits for the synchronizing burst SB1 from the new radio base station 13. Upon receiving the synchronizing burst SB1, the mobile station 11 exchanges the synchronizing bursts SB2–SB4 with the new radio base station 13. Upon receiving the synchronizing burst SB4, the new radio base station 13 reports the completion of the exchange of synchronizing bursts to the base station control unit 18 in accordance with the synchronization-complete OK signal (14) and transmits the downward communication burst (8). Upon receiving the downward communication burst (8), the mobile station 11 transmits the upward communication burst (9). If the upward communication burst (9) is received from the mobile station 11, the new radio base station 13 sends the TCH start-up complete signal (15) to the base station control unit 18, whereby handover (channel assignment) is completed. As a result of this operation, the content of management table 18a changes in the manner shown in FIG. 15.

In accordance with first handover control, handover is possible and the mobile station is capable of roaming across radio zones while communicating even in a case where an assignable radio channel is not available at the base station to which handover is made.

(b) Second handover control sequence (b-1) Description of signals

Figure 16:
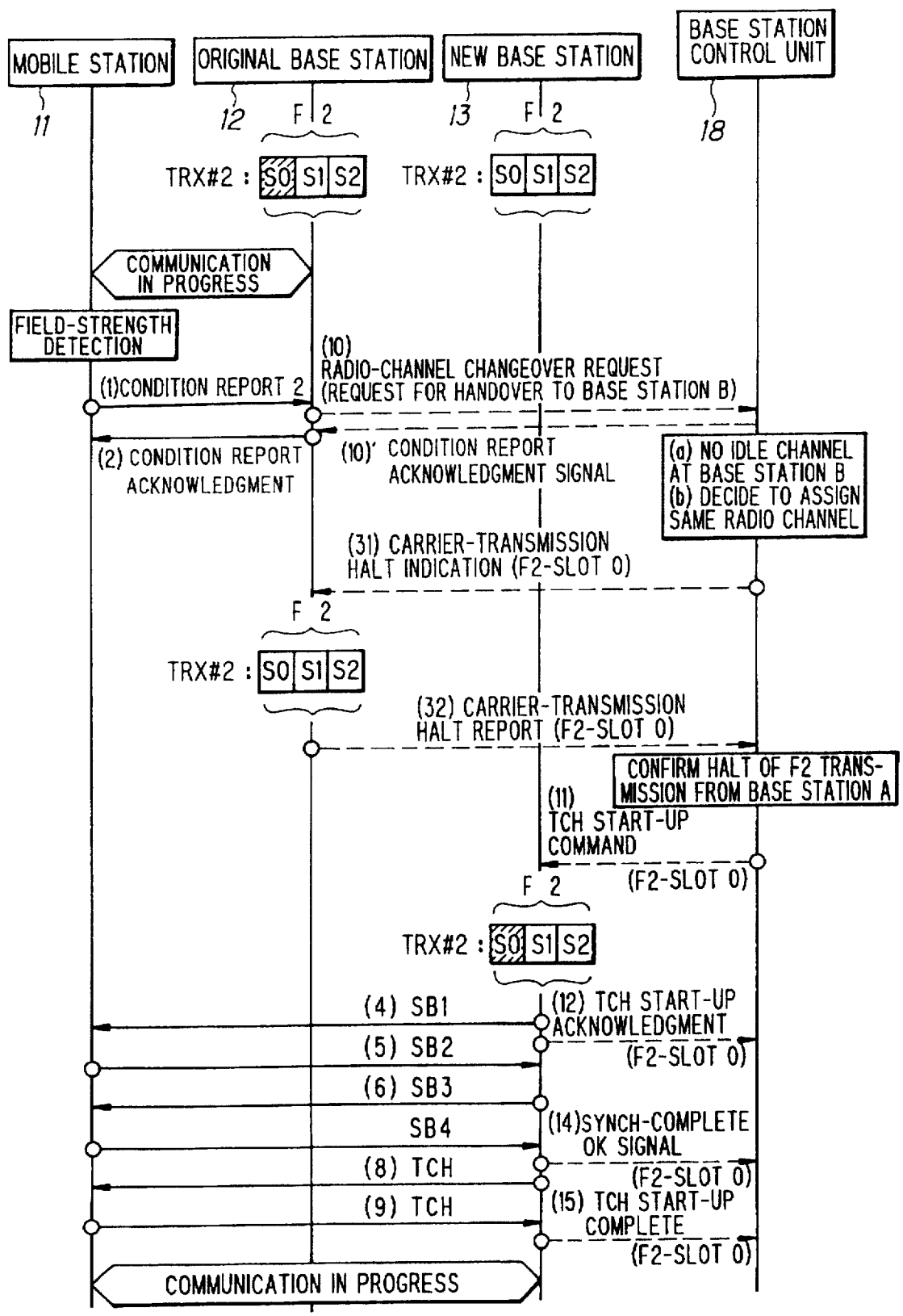
FIG. 16 shows a second handover control sequence.

FIG. 16 is a diagram for describing a second handover control sequence according to the present invention. Here numbers identical with those of the first control sequence shown in FIG. 11 are designated by like reference characters. This sequence differs from the first control sequence in that base station control unit 18 sends a carrier-transmission halt indication signal (31), instead of the same-radio-channel assignment indication signal (21), to the original radio base station 12, and in that the original radio base station 12 does not transmit the handover radio channel set message (3) to the mobile station 11.

In FIG. 16, the carrier-transmission halt indication signal (31) is a signal by which the base station control unit 18 instructs the original radio base station 12 to halt the transmission of the pertinent radio channel. A carrier-transmission halt report signal (32) is a signal by which the base station control unit 18 is notified of the fact that transmission of the designated radio channel (carrier) has been halted.

(b-2) Handover control

Upon receiving the message (1) of condition report 2 from the mobile station 11, the original radio base station 12 notifies the base station control unit 18 [i.e., sends the radio-channel changeover request signal (10)].

Upon receiving the radio-channel changeover request signal (10) and deciding to implement handover, the base station control unit 18 refers to the management table 18a and searches for an assignable radio channel at the new radio base station 13 (the base station to which the mobile station is to be handed over). If there is no assignable radio channel at the new radio base station 13, the base station control unit 18 executes processing, in accordance with the flowchart of FIG. 7, for assigning the same radio channel. It should be noted that an arrangement may be adopted in which precedence is given to assignment of the same radio channel even in a case where an assignable idle radio channel exists at the new radio base station 13.

If, as a result of the processing of FIG. 7 for assigning the same radio channel, it is possible to assign the mobile station 11 a radio channel the same as that assigned to the mobile station until now, the base station control unit 18 sends the original radio base station 12 the carrier-transmission halt indication signal (31), thereby instructing the radio base station 12 to stop transmitting the radio channel. If the carrier-transmission halt indication signal (31) is received, the original radio base station 12 halts the transmission of this radio channel (carrier) and notifies the base station control unit 18, by way of the carrier-transmission halt report signal (32), of the fact that the carrier has been shut down.

If the carrier-transmission halt report signal (32) is received from the original radio base station 12, the base station control unit 18 sends the TCH start-up command signal (11) to the new radio base station 13, thereby commanding, by means of this signal, the radio base station 13 to activate the radio channel halted at the original radio base station 12. Upon receiving the TCH start-up command signal (11), the new radio base station 13 activates this radio channel, starts transmission of the synchronizing burst SB1 and notifies the base station control unit 18, by way of the TCH start-up acknowledgment signal (12), of the fact that the telecommunication channel has been activated.

Meanwhile, the mobile station 11 does not change over the radio channel and receives the synchronizing burst SB1 sent from the new radio base station 13 on the same radio channel as that used so far. Upon receiving the synchronizing burst SB1, the mobile station 11 exchanges the synchronizing bursts SB2–SB4 with the new radio base station 13. Upon receiving the synchronizing burst SB4, the new radio base station 13 reports the completion of the exchange of synchronizing bursts to the base station control unit 18 in accordance with the synchronization-complete OK signal (14) and transmits the downward communication burst (8). Upon receiving the downward communication burst (8), the mobile station 11 transmits the upward communication burst (9). If the upward communication burst (9) is received from the mobile station 11, the new radio base station 13 sends the TCH start-up complete signal (15) to the base station control unit 18, whereby handover (channel assignment) is completed. As a result of this operation, the content of management table 18a changes in the same manner as in the first control sequence, as illustrated in FIG. 15.

In accordance with second handover control, effects similar to those of first handover control are obtained. Moreover, since transmission of the handover radio channel set message (3) can be omitted, the time required for handover control can be shortened.

(c) Third handover control sequence (c-1) Description of signals

Figure 17:
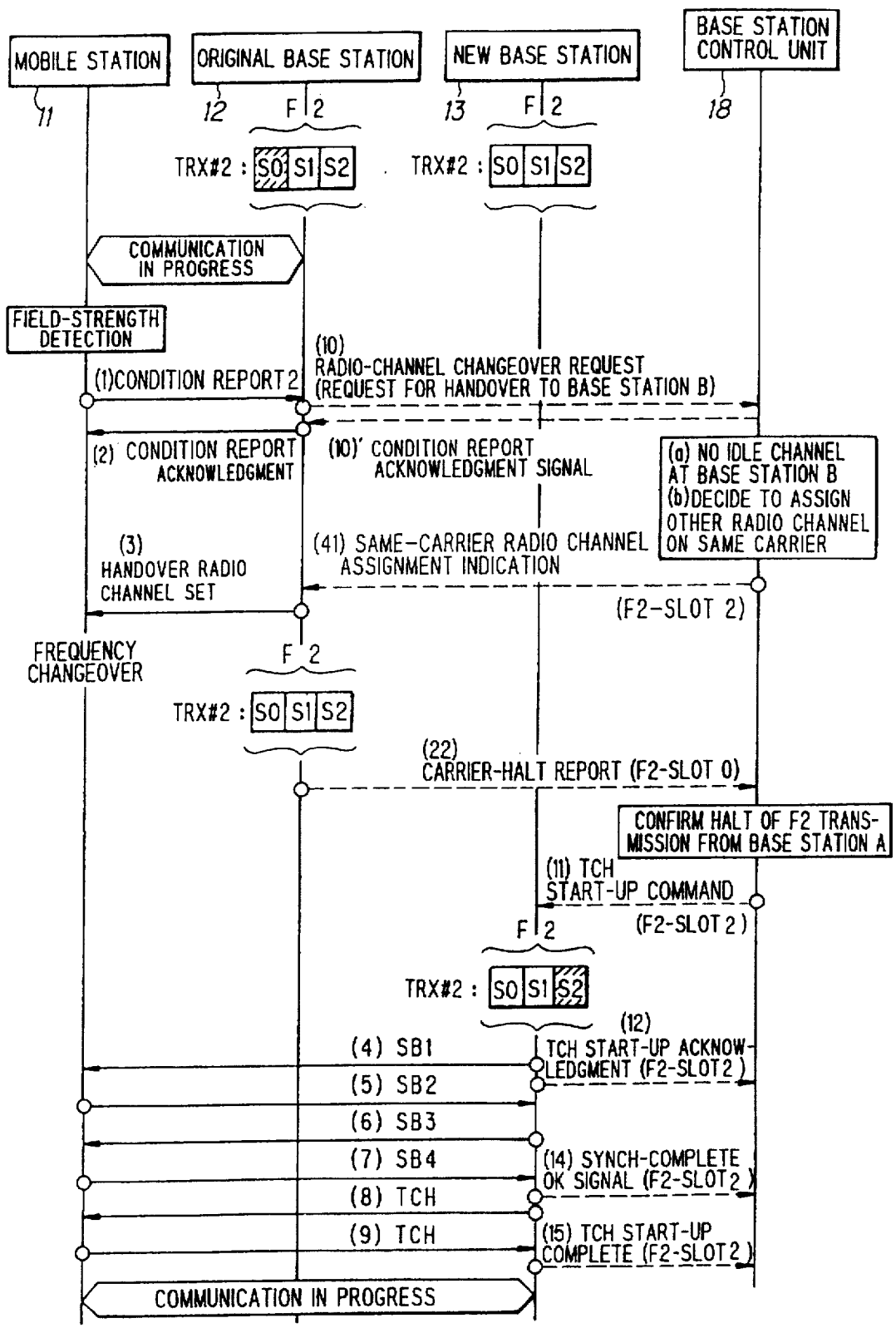
FIG. 17 shows a third handover control sequence.

FIG. 17 is a diagram for describing a third handover control sequence according to the present invention. Here numbers identical with those of the first control sequence shown in FIG. 11 are designated by like reference characters. This handover control sequence differs from the first control sequence as follows: In first handover control, a radio channel the same as that used thus far is assigned as the handover radio channel, namely the radio channel to which handover is to be made. In third handover control, however, another radio channel whose frequency is the same as that of the radio channel used thus far but whose time slot is different is assigned as the handover radio channel.

In FIG. 17, a same-carrier radio channel assignment indication signal (41) is a signal by which the base station control unit 18 instructs the original radio base station 12 to (a) assign another radio channel on the same carrier and (b) halt transmission of this radio channel immediately after sending the mobile station 11 the handover radio channel set message (3).

(c-2) Handover control

Upon receiving the message (1) of condition report 2 from the mobile station 11, the original radio base station 12 notifies the base station control unit 18 [i.e., sends the radio-channel changeover request signal (10)].

Upon receiving the radio-channel changeover request signal (10) and deciding to implement handover, the base station control unit 18 refers to the management table 18a and searches for an assignable radio channel at the new radio base station 13 (the base station to which the mobile station is to be handed over). If there is no assignable radio channel at the new radio base station 13, the base station control unit 18 executes processing, in accordance with the flowchart of FIG. 7, for assigning the same radio channel. In this case, the processing of step 104 is revised to "ASSIGN MOBILE STATION 11 ANOTHER RADIO CHANNEL WHOSE FREQUENCY IS SAME AS THAT OF RADIO CHANNEL OF MOBILE STATION 11 TILL NOW BUT WHOSE TIME SLOT IS DIFFERENT".

If, as a result of the processing of FIG. 7, it is possible to assign the mobile station 11 another radio channel of frequency F2, which is the same as that of the radio channel used thus far, the time slot of which is different (i.e., the radio channel of frequency F2, time slot #2), then the base station control unit 18 sends the original radio base station 12 the same-carrier radio channel assignment indication signal (41). The original radio base station 12 sends the mobile station 11, by way of the handover radio channel set message (3), the information (the handover radio channel) contained in the signal (41), thereby notifying the mobile station 11 of the handover radio channel. Further, after the handover radio channel set message (3) is sent, the original radio base station 12 halts the transmission of the radio channel assigned to the mobile station 11 till now and notifies the base station control unit 18, by way of the carrier-halt report signal (22), of the fact that the carrier has been shut down.

If the base station control unit 18 receives the carrier-halt report signal (22) from the original radio base station 12, the base station control unit 18 sends the TCH start-up command signal (11) to the new radio base station 13, thereby commanding the radio base station 13 to activate the radio channel (telecommunication channel) newly assigned to the mobile station 11. Upon receiving the TCH start-up command signal (11), the new radio base station 13 activates this radio channel, starts transmission of the synchronizing burst SB1 and notifies the base station control unit 18, by way of the TCH start-up acknowledgment signal (12), of the fact that the telecommunication channel has been activated.

Upon receiving the handover radio channel set message (3), the mobile station 11 changes over the radio channel to the radio channel of frequency F2, time slot #2 in accordance with the message information and waits for the synchronizing burst SB1 from the new radio base station 13. Upon receiving the synchronizing burst SB1, the mobile station 11 exchanges the synchronizing bursts SB2~SB4 with the new radio base station 13. Upon receiving the synchronizing burst SB4, the new radio base station 13 reports the completion of the exchange of synchronizing bursts to the base station control unit 18 in accordance with the synchronization-complete OK signal (14) and transmits the downward communication burst (8). Upon receiving the downward communication burst (8), the mobile station 11 transmits the upward communication burst (9). If the upward communication burst (9) is received from the mobile station 11, the new radio base station 13 sends the TCH start-up complete signal (15) to the base station control unit 18, whereby handover (channel assignment) is completed. As a result of this operation, the content of management table 18a changes in the manner shown in FIG. 15.

In accordance with third handover control, handover is possible and the mobile station is capable of roaming across radio zones while communicating even in a case where an assignable radio channel is not available at the base station to which handover is made.

(d) Fourth handover control sequence (d-1) Description of signals

FIG. 16 is a diagram for describing a second handover control sequence according to the present invention. Here numbers identical with those of the first control sequence shown in FIG. 11 are designated by like reference characters. This sequence differs from the first control sequence in that after receiving the TCH start-up complete signal (15), the base station control unit 18 notifies the mobile station 11 of the fact that the radio base station has been changed over.

Figure 19:
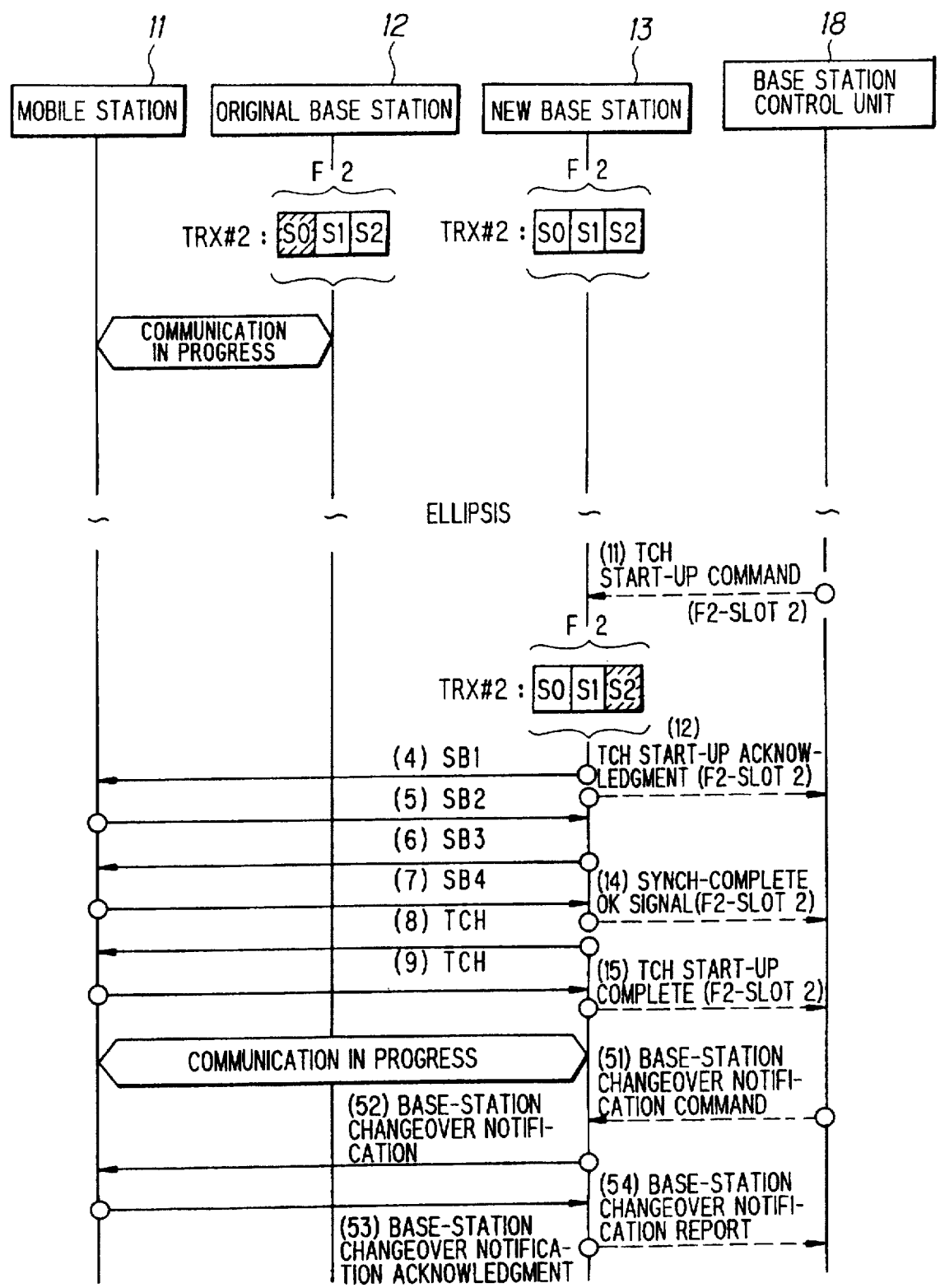
FIG. 19 shows a fourth handover control sequence.

In FIG. 19, a base-station changeover notification command signal (51) is a signal by which the base station control unit 18 commands the new radio base station 13 to transmit a signal which notifies the mobile station 11 of the fact that the base station sending the carrier has been changed over. A base-station changeover notification message (52) is a message by which the new radio base station 13, upon receiving the base-station changeover notification command signal (51) from the base station control unit 18, notifies the mobile station 11 of the fact that the base station sending the carrier has been changed over. A base-station changeover notification acknowledge message (53) is a message which the mobile station 11 sends to the new radio base station 13 as acknowledgment of receipt of the base-station changeover notification acknowledge message (53). A base-station changeover notification report signal (54) is a signal by which the new radio base station 13 reports to the base station control unit 18 the fact that the base-station changeover notification acknowledge message (53) has been received from the mobile station 11.

(d-2) Handover control

Operation up to the point at which the new radio base station 13 sends the TCH start-up complete signal (15) to the base station control unit 18 is the same as that shown in FIG. 17.

After the changeover (handover) of the base station which sends the carrier, the base station control unit 18 sends the base-station changeover notification command signal (51) to the new radio base station 13 so that the mobile station 11 will be notified of the fact that the base station has been changed over (handed over). Upon receiving the base-station changeover notification command signal (51), the new radio base station 13 sends the mobile station 11 the base-station changeover notification message (52), which is illustrated in FIG. 20, whereby the mobile station is notified of changeover of the base station. By receiving the base-station changeover notification message (52), the mobile station 11 is capable of recognizing that handover has been completed normally as well as the particular base station to which handover has been made.

Next, the mobile station 11 sends back the base-station changeover notification acknowledge message (53), which is shown in FIG. 21, to the new radio base station 13. Upon receiving the base-station changeover notification acknowledge message (53), the new radio base station 13 transmits the base-station changeover notification report signal (54) to the base station control unit 18. By receiving the base-station changeover notification report signal (54) from the new radio base station 13, the base station control unit 18 confirms that the mobile station 11 has been positively notified of the base-station changeover notification message (52).

It should be noted that an arrangement may be adopted in which the mobile station 11 does not transmit the base-station changeover notification acknowledge message (53).

(e) Fifth handover control sequence (e-1) Description of signals

Figure 22:
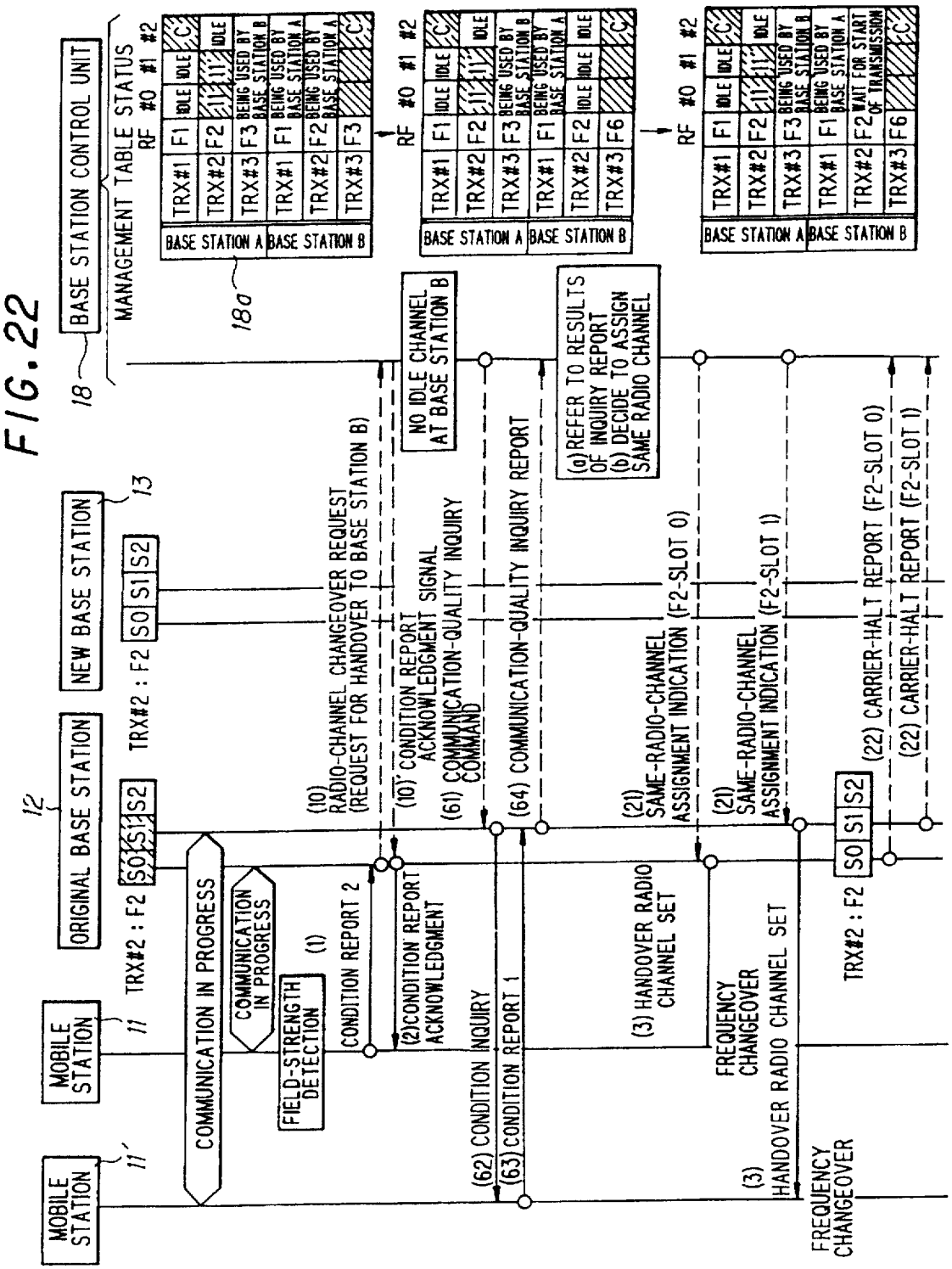
FIG. 22 shows a fifth handover control sequence (part 1)
Figure 23:
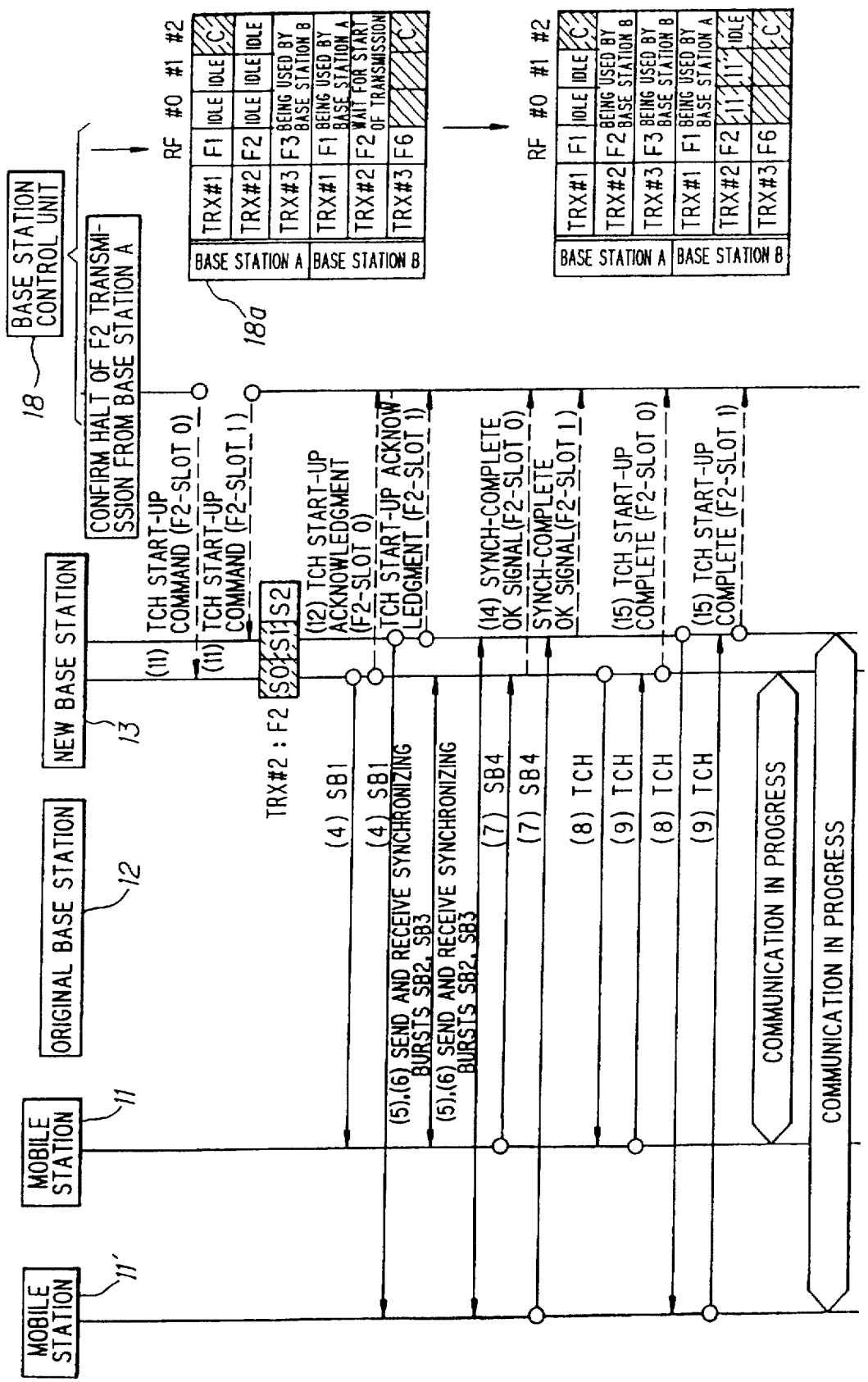
FIG. 23 shows a fifth handover control sequence (part 1)

FIGS. 22 and 23 are diagrams for describing a fifth handover control sequence according to the present invention. Here numbers identical with those of the first handover control sequence shown in FIG. 11 are designated by like reference characters. This handover control sequence differs from the first control sequence as follows: (a) The radio channel of another time slot of the frequency being used by the mobile station 11 to be handed over is being used by another mobile station, and (b) the base station control unit 18 decides upon the handover radio channel in accordance with the processing flowchart of FIG. 9 or 10.

A communication-quality inquiry command signal (61) is a signal by which the base station control unit 18 commands the original radio base station 12 to inquire about the communication quality of another mobile station 11' using a radio channel whose carrier (radio frequency) is the same as that of the mobile station 11 but whose time slot is different. A condition inquiry message (62) is a signal by which the original radio base station 12, which has received the communication-quality inquiry command signal (61), interrogates the mobile station 11' about its communication quality. A condition report message (63) is a signal by which the mobile station 11', which has received the inquiry about communication quality, reports the quality of communication to the original radio base station 12. A communication-quality inquiry report signal (64) is a signal by which the original radio base station 12 reports on the communication quality of the mobile station 11' to the base station control unit 18.

(e-2) Handover control

Upon receiving the message (1) of condition report 2 from the mobile station 11, the original radio base station 12 notifies the base station control unit 18 [i.e., sends the radio-channel changeover request signal (10)].

Upon receiving the radio-channel changeover request signal (10) and deciding to implement handover, the base station control unit 18 executes radio-channel assignment processing in accordance with the flowchart of FIG. 10. First, the base station control unit 18 refers to the management table 18a and searches for an assignable radio channel at the new radio base station 13 (the base station to which the mobile station is to be handed over). If there is no assignable radio channel at the new radio base station 13 ("NO" at step 252 in FIG. 10), the base station control unit 18 executes the processing of steps 254 onward to assign the same radio channel.

If the radio channels of the other time slots #1, #2 of frequency F2 used by the mobile station 11 are currently being used by the other mobile station 11', then the base station control unit 18 judges whether the communication quality of the other mobile station 11' will be acceptable even if the other mobile station 11' is handed over together with the mobile station 11. In other words, the base station control unit 18 transmits the communication-quality inquiry command signal (61) to the original radio base station 12 in order to interrogate the mobile station 11' about its quality of communication.

Upon receiving the communication-quality inquiry command signal (61), the original radio base station 12 sends the mobile station 11' the condition inquiry message (62) in order to interrogate this mobile station concerning its communication quality. FIG. 24 illustrates the format of the condition inquiry message. Upon receiving the condition inquiry message (62), the mobile station 11' notifies the original radio base station 12 of its current communication quality by way of the condition report message (63). FIG. 25 is a diagram for describing the message of the condition report 1. The message includes message type, reception level, selected number N of radio zones, and combinations of reception levels from N-number of base stations and control channel numbers.

Upon receiving notification of communication quality from the mobile station 11', the original radio base station 12 reports the communication quality to the base station control unit 18 by way of the communication-quality inquiry report signal (64). On the basis of the communication quality reported, the base station control unit 18 judges whether the base station of the mobile station 11' is capable of being changed over. More specifically, the base station control unit 18 determines whether the reception field strength of radio waves from the new radio base station 13 of mobile station 11' is greater than a set level. If the reception field strength is higher than the set level, then the base station control unit 18 switches over the base station using the frequency F2 from the current radio base station 12 to the new radio base station 13 and does not change the radio channels that were assigned to the mobile station 11 and to the other mobile station 11'. These radio channels are kept as the assigned radio channels even after handover is performed.

Thereafter, the base station control unit 18 sends the original radio base station 12 the same-radio-channel assignment indication signals (21), one for each of the mobile stations 11, 11'.

Upon receiving the same-radio-channel assignment indication signals (21), the original radio base station 12 transmits the handover radio channel set messages (3), one to the mobile station 11 and one to the mobile station 11'. Further, the original radio base station 12 halts the transmission of the radio channel after sending the handover radio channel set message (3) to each of the mobile stations 11, 11' and, by way of the carrier-halt report signal (22), reports to the base station control unit 18 the fact that the carrier has been halted.

Upon receiving the carrier-halt report signal (22) from the original radio base station 12, the base station control unit 18 sends the TCH start-up command signal (11) to the new radio base station 13, thereby commanding the radio base station 13 to activate the radio channel of each of the mobile stations 11, 11' halted at the original radio base station 12. Upon receiving the TCH start-up command signal (11), the original radio base station 13 activates this radio channel, starts transmission of the synchronizing burst SB1 and notifies the base station control unit 18, by way of the TCH start-up acknowledgment signal (12), of the fact that the telecommunication channel has been activated.

When the mobile stations 11, 11' receive the handover radio channel set message (3), the mobile stations change over the frequency (though it is unnecessary to do so in actuality) in accordance with the message information and wait for the synchronizing burst SB1 from the new radio base station 13. Upon receiving the synchronizing burst SB1, the mobile stations 11, 11' exchange the synchronizing bursts SB2~SB4 with the new radio base station 13. Upon receiving the synchronizing burst SB4, the new radio base station 13 reports the completion of the exchange of synchronizing bursts to the base station control unit 18 in accordance with the synchronization-complete OK signal (14) and transmits the downward communication burst (8). Upon receiving the downward communication burst (8), the mobile stations 11, 11' transmit the upward communication burst (9). If the upward communication burst (9) is received from each of the mobile stations 11, 11', the new radio base station 13 sends the TCH start-up complete signal (15) to the base station control unit 18, whereby handover (channel assignment) is completed. As a result of this operation, the content of management table 18a changes in the manner shown on the right side of FIGS. 22 and 23.

In the foregoing, the base station control unit 18 executes assignment of radio channels in accordance with the flowchart of FIG. 10. However, the base station control unit 18 is capable of executing assignment of radio channels in accordance with the flowchart of FIG. 9 as well. In such case a radio channel the same as that used thus far would be assigned to the mobile station 11 even if an assignable idle radio channel were to exist at the new radio base station 13.

In accordance with fifth handover control, handover is possible and the mobile station is capable of roaming across radio zones while communicating even in a case where a radio channel whose frequency is the same as radio channel frequency F2 of mobile station 11 but whose time slot is different is being used by the other mobile station.

(f) Sixth handover control sequence

Figure 26:
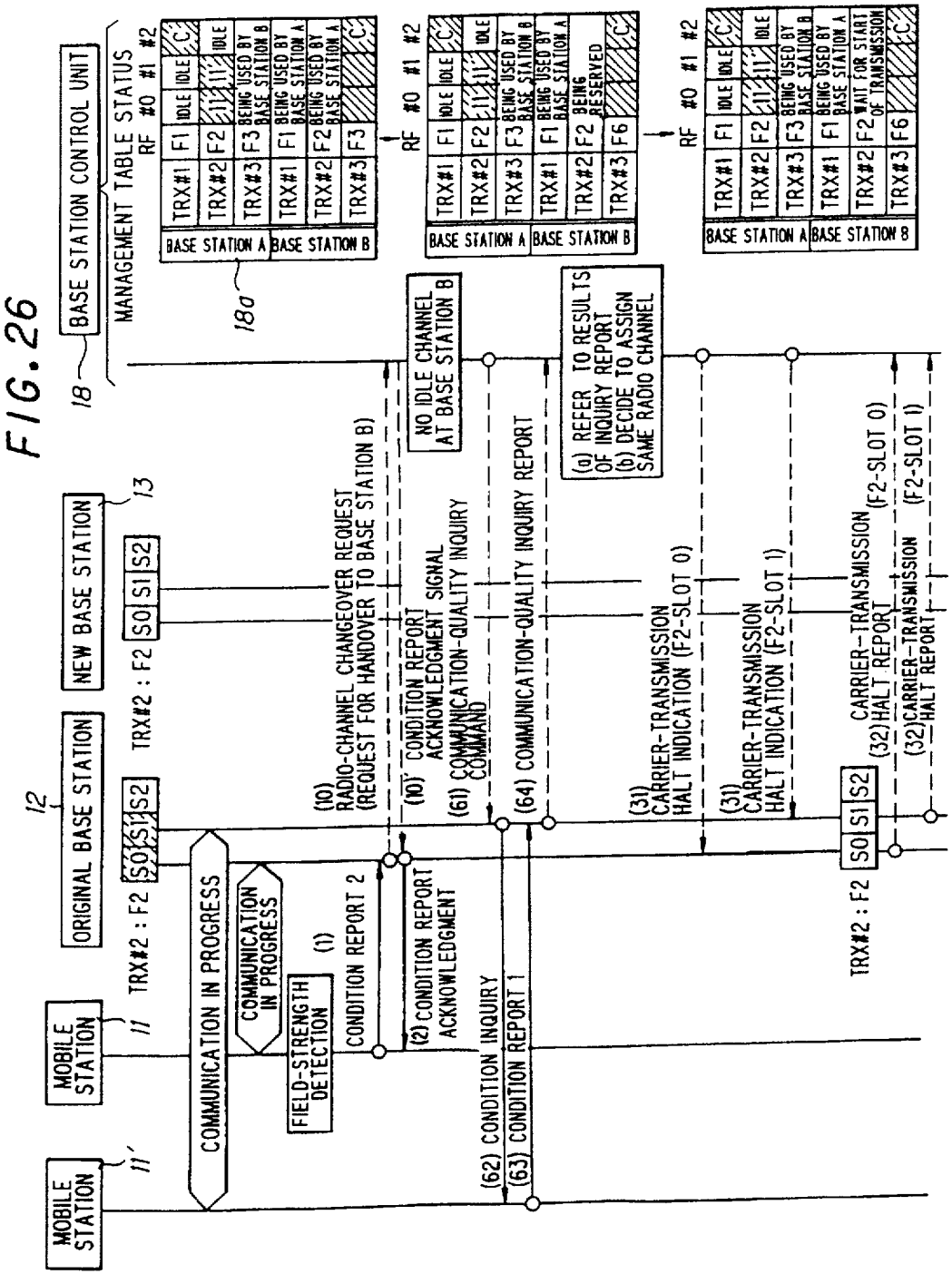
FIG. 26 shows a sixth handover control sequence (part 1)
Figure 27:
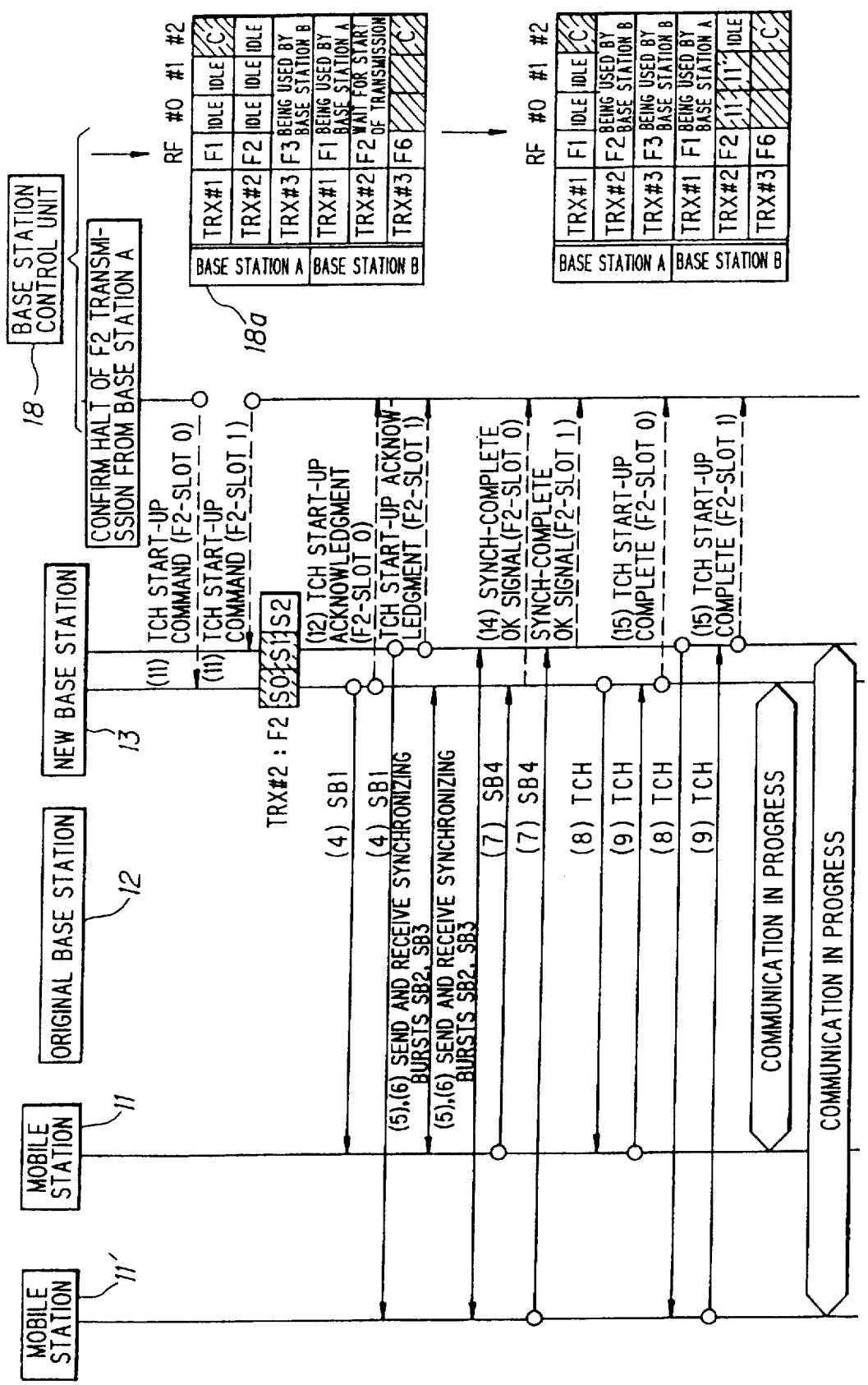
FIG. 27 shows a sixth handover control sequence (part 2)

FIGS. 26 and 27 are diagrams for describing a sixth handover control sequence according to the present invention. Here numbers identical with those of the fifth handover control sequence shown in FIGS. 22 and 23 are designated by like reference characters. The sixth handover control sequence differs from the fifth control sequence as follows: (a) The base station control unit 18 sends the carrier-transmission halt indication signal (31), instead of the same-radio-channel assignment indication signal (21), to the original radio base station 12, and (b) the radio base station 12 does not designate the new radio base station to the mobile stations 11, 11'.

The carrier-transmission halt indication signal (31) is the signal by which the base station control unit 18 instructs the original radio base station 12 to halt the transmission of the pertinent radio channel. The carrier-transmission halt report signal (32) is the signal by which the base station control unit 18 is notified of the fact that transmission of the designated radio channel (carrier) has been halted.

(g) Seventh handover control sequence (g-1) Description of signals

Figure 28:
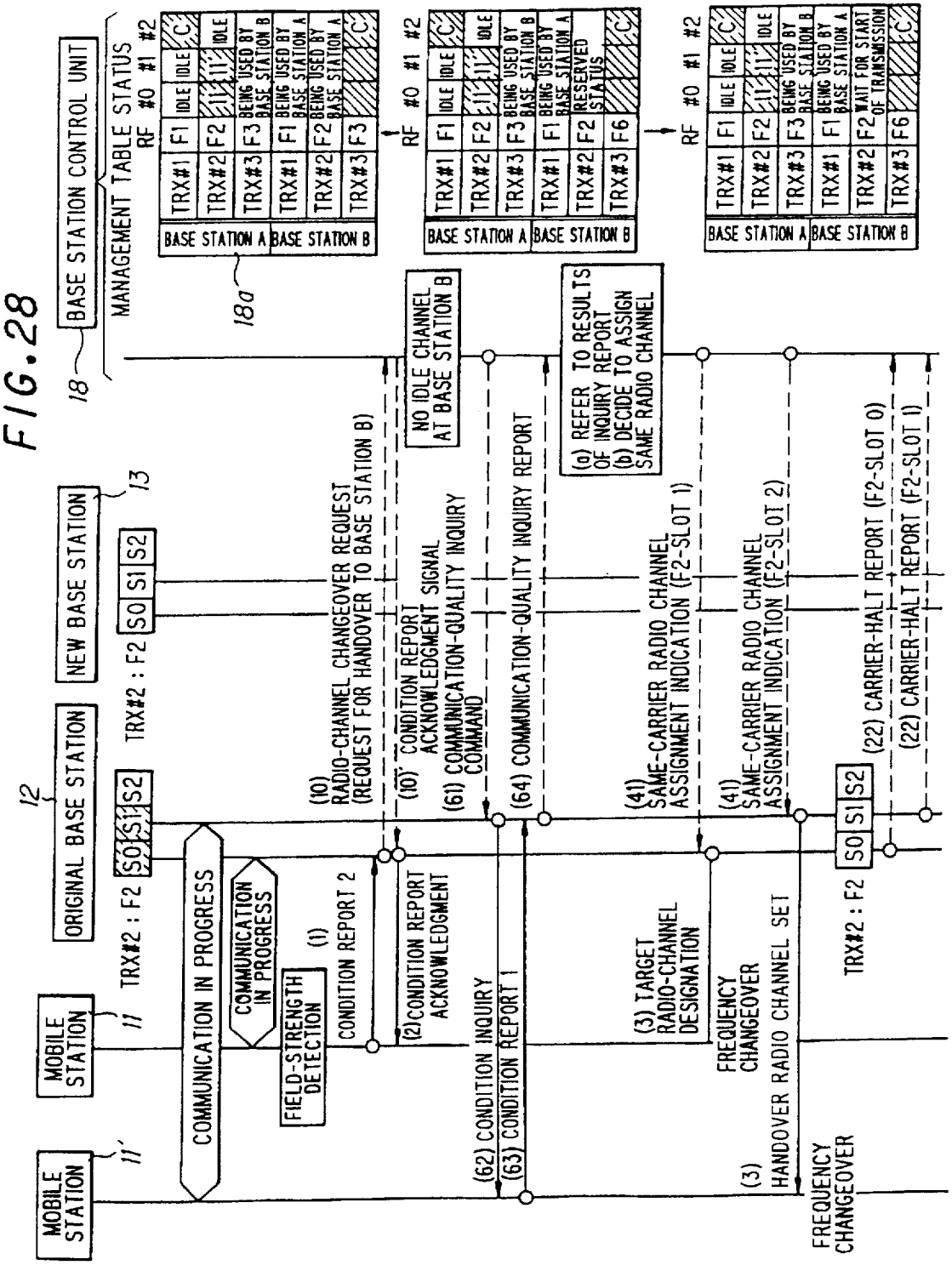
FIG. 28 shows a seventh handover control sequence (part 1)
Figure 29:
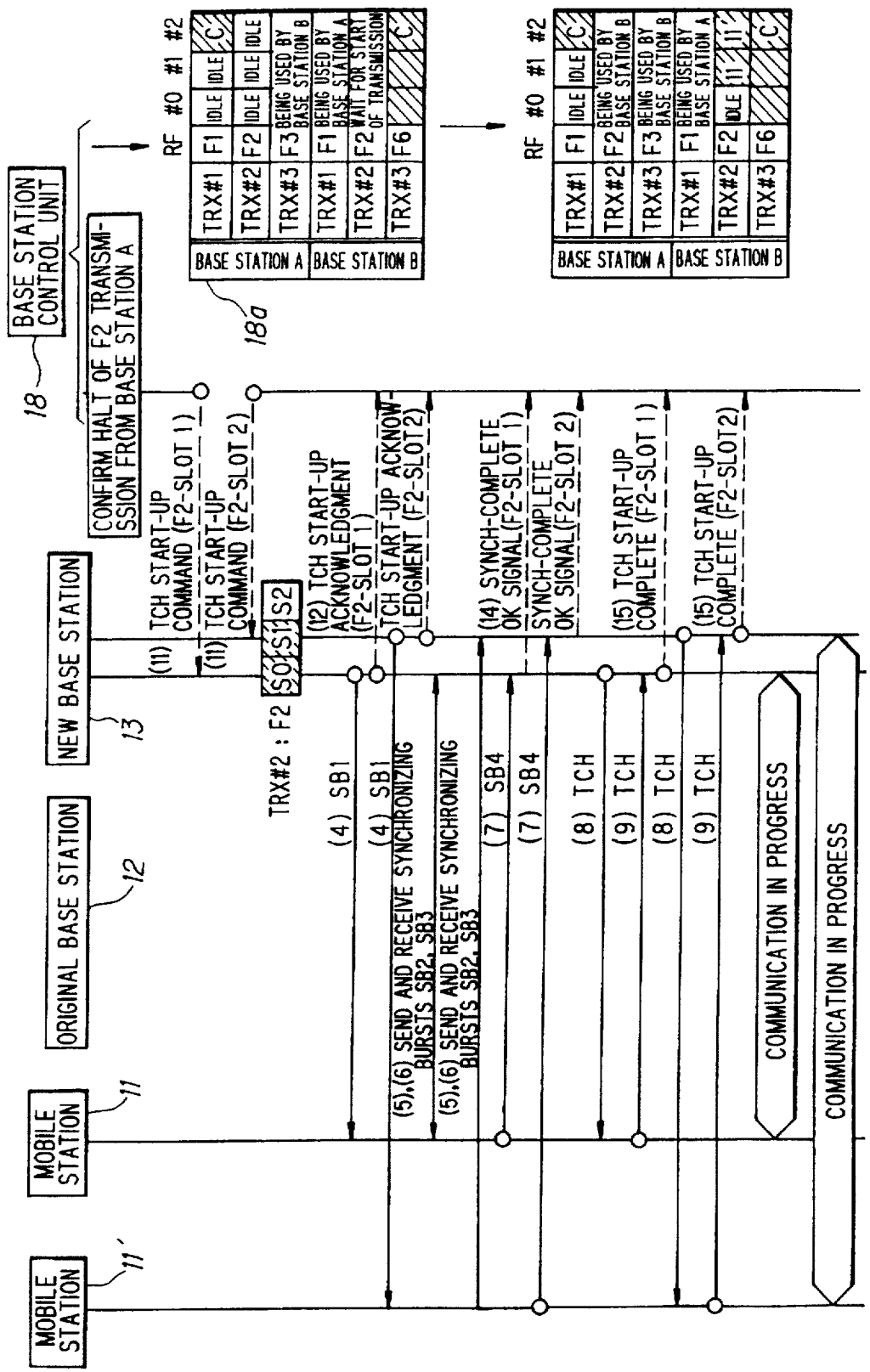
FIG. 29 shows a seventh handover control sequence (part 2)

FIGS. 28 and 29 are diagrams for describing a seventh handover control sequence according to the present invention. Here numbers identical with those of the fifth handover control sequence shown in FIGS. 22 and 23 are designated by like reference characters. This handover control sequence differs from the fifth control sequence as follows: In fifth handover control, a radio channel the same as that used thus far is assigned as the handover radio channel. In seventh handover control, however, another radio channel whose frequency is the same as that of the radio channel used thus far but whose time slot is different is assigned as the handover radio channel.

In FIG. 28, the same-carrier radio channel assignment indication signal (41) is the signal by which the base station control unit 18 instructs the original radio base station 12 to (a) assign another radio channel on the same carrier and (b) halt transmission of this radio channel immediately after sending the mobile stations 11, 11' the handover radio channel set message (3).

(g-2) Handover control

Upon receiving the message (1) of condition report 2 from the mobile station 11, the original radio base station 12 notifies the base station control unit 18 [i.e., sends the radio-channel changeover request signal (10)].

Upon receiving the radio-channel changeover request signal (10) and deciding to implement handover, the base station control unit 18 executes radio-channel assignment processing in accordance with the flowchart of FIG. 10. It should be noted that the processing of step 250 in FIG. 10 is revised to "ASSIGN MOBILE STATIONS 11, 11' ANOTHER RADIO CHANNEL WHOSE FREQUENCY IS SAME AS THAT OF RADIO CHANNEL OF MOBILE STATIONS 11, 11' TILL NOW BUT WHOSE TIME SLOT IS DIFFERENT".

First the base station control unit 18 refers to the management table 18a and searches for an assignable radio channel at the new radio base station 13 (the base station to which the mobile station is to be handed over). If there is no assignable radio channel at the new radio base station 13 (step 252 in FIG. 10), the base station control unit 18 executes the processing of steps 254 onward to assign the same radio channel.

If the radio channels of the other time slots #1, #2 of frequency F2 used by the mobile station 11 are currently being used by the other mobile station 11', then the base station control unit 18 judges whether the communication quality of the other mobile station 11' will be acceptable even if the other mobile station 11' is handed over together with the mobile station 11. In other words, the base station control unit 18 transmits the communication-quality inquiry command signal (61) to the original radio base station 12 in order to interrogate the mobile station 11' about its quality of communication.

Upon receiving the communication-quality inquiry command signal (61), the original radio base station 12 sends the mobile station 11' the condition inquiry message (62) in order to interrogate this mobile station concerning its communication quality. Upon receiving the condition inquiry message (62), the mobile station 11' notifies the original radio base station 12 of its current communication quality by way of the condition report message (63).

Upon receiving notification of communication quality from the mobile station 11', the original radio base station 12 reports the communication quality to the base station control unit 18 by way of the communication-quality inquiry report signal (64). On the basis of the communication quality reported, the base station control unit 18 judges whether the base station of the mobile station 11' is capable of being changed over. More specifically, the base station control unit 18 determines whether the reception field strength of radio waves from the new radio base station 13 of mobile station 11' is greater than a set level. If the reception field strength is higher than the set level, then the base station control unit 18 (a) switches over the base station using the frequency F2 from the current radio base station 12 to the new radio base station 13 and (b) decides to assign respective ones of the mobile stations 11, 11' other radio channels (the radio channel of frequency F2, time slot #1 and the radio channel of frequency F2, time slot #2) whose frequencies are the same as the frequency F2 assigned thus far to the mobile stations 11, 11' but whose times lots are different.

Thereafter, the base station control unit 18 sends the original radio base station 12 the same-carrier radio channel assignment indication signals (41), one for each of the mobile stations 11, 11'. The original radio base station 12 sends the mobile stations 11, 11', by way of the handover radio channel set message (3), the information contained in the signal (41), thereby notifying the mobile stations 11, 11' of the handover radio channels. Further, after the handover radio channel set message (3) is sent, the original radio base station 12 halts the transmission of the radio channels assigned to the mobile stations 11, 11' till now and notifies the base station control unit 18, by way of the carrier-halt report signal (22), of the fact that the carriers have been shut down.

If the base station control unit 18 receives the report of carrier shut-down by way of the carrier-halt report signal (22) from the original radio base station 12, the base station control unit 18 sends the TCH start-up command signal (11) to the new radio base station 13, thereby commanding the radio base station 13 to activate the radio channels (telecommunication channels) newly assigned to the mobile stations 11, 11'. Upon receiving the TCH start-up command signal (11), the new radio base station 13 activates these radio channels, starts transmission of the synchronizing burst SB1 and notifies the base station control unit 18, by way of the TCH start-up acknowledgment signal (12), of the fact that the telecommunication channels have been activated.

Upon receiving the handover radio channel set message (3), the mobile stations 11, 11' change over frequency in accordance with the message information and wait for the synchronizing burst SB1 from the new radio base station 13. Upon receiving the synchronizing burst SB1, the mobile stations 11, 11' exchange the synchronizing bursts SB2~SB4 with the new radio base station 13. Upon receiving the synchronizing burst SB4, the new radio base station 13 reports the completion of the exchange of synchronizing bursts to the base station control unit 18 in accordance with the synchronization-complete OK signal (14) and transmits the downward communication burst (8). Upon receiving the downward communication burst (8), the mobile stations 11, 11' transmit the upward communication burst (9). If the upward communication burst (9) is received from the mobile stations 11, 11', the new radio base station 13 sends the TCH start-up complete signal (15) to the base station control unit 18, whereby handover (channel assignment) is completed. As a result of this operation, the content of management table 18a changes in the manner shown on the right side of FIGS. 28 and 29.

In the foregoing, the base station control unit 18 executes assignment of radio channels in accordance with the flowchart of FIG. 10. However, the base station control unit 18 is capable of executing assignment of radio channels in accordance with the flowchart of FIG. 9 as well. In such case a radio channel the same as that used thus far would be assigned to the mobile station 11 even if an assignable idle radio channel were to exist at the new radio base station 13.

(h) Eighth handover control sequence

Figure 30:
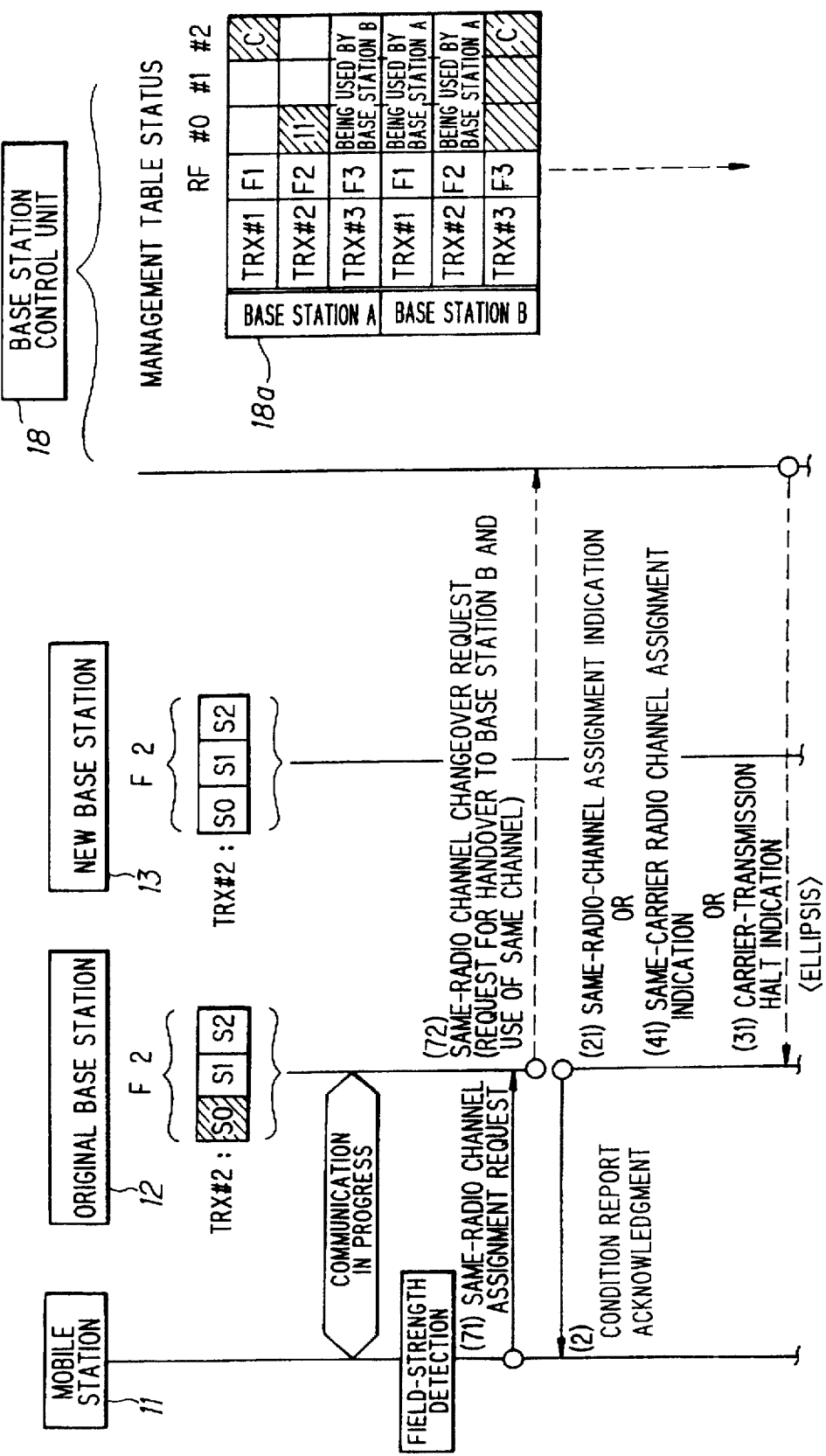
FIG. 30 shows an eighth handover control sequence.
Figure 31:
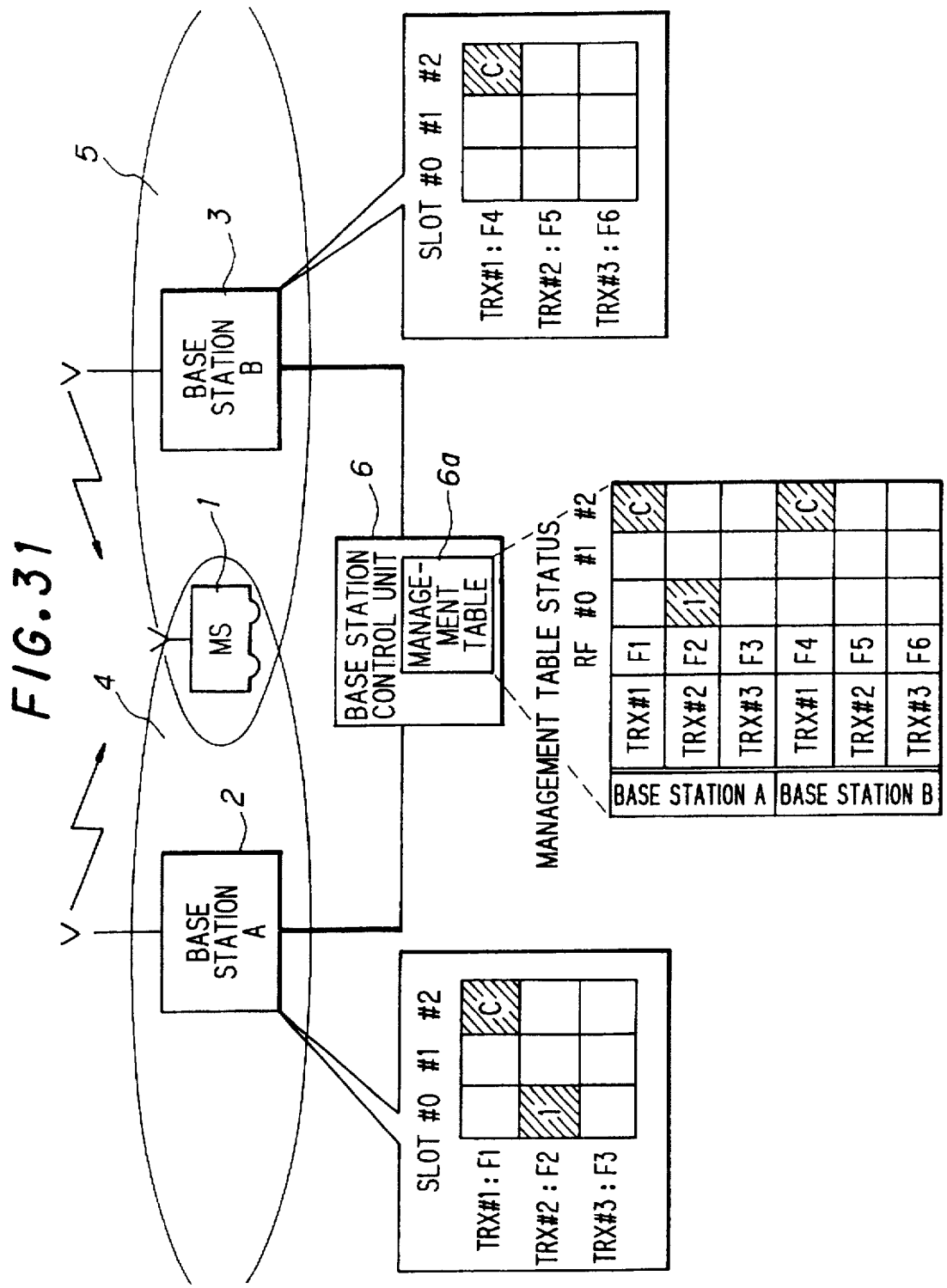
FIG. 31 is a diagram showing the configuration of a digital-type car telephone system according to the prior art.

FIG. 30 is a diagram for describing an eighth handover control sequence according to the present invention. Here, when the mobile station judges the state of its reception and requests the original radio base station 12 to implement handover, the request is to perform handover without changing the currently assigned radio channel.

In FIG. 30, a same-radio-channel assignment request message (71) is a message by which the mobile station 11 requests, at the time of handover, assignment of the same radio channel or a radio channel on the same carrier. A same-radio-channel changeover request signal (72) is a signal by which the original radio base station 12 notifies the base station control unit 18 of the fact that assignment of a radio channel the same as that used thus far has been requested by the mobile station 11.

Upon receiving the same-radio-channel assignment request message (71) form the mobile station 11, the radio base station 12 sends the same-radio-channel changeover request signal (72) to the base station control unit 18. Upon receiving the same-radio-channel changeover request signal (72), the base station control unit 18 assigns the same radio channel or another radio channel having the same frequency in accordance with the radio channel assignment processing of FIG. 7 or FIG. 9 and then performs handover through a sequence similar to that of FIG. 11 or FIG. 17.

Though the present invention has been described in accordance with an embodiment thereof, the invention can be modified in various ways within the scope of the claim.

In accordance with the present invention, handover is made possible, even if a new radio base station to which a changeover is to be made does not possess an idle channel, because the base station which uses the radio channel frequency of the mobile station is changed to the new base station. As a result, the mobile station is capable of maintaining excellent communication quality.

Further, besides ordinary handover, it is also possible to carry out handover by changing the base station which uses the radio channel frequency of the mobile station to the new base station. The result is an increase in selection patterns in which handover is possible in the system, thus improving service in a mobile telecommunication system.

Further, after the mobile station is handed over to the new radio base station, the latter notifies the mobile station of the fact that the base station has been switched. This makes it possible for the user to recognize to which base station the mobile station is currently connected. This also improves service in a mobile telecommunication system.

Further, even if an idle channel does not exist in a new radio base station and even if a radio channel whose frequency is the same as that used by the mobile station but whose time slot is different has been assigned to another mobile station, handover is possible without sacrificing the communication quality of the other mobile station. The mobile station can therefore maintain excellent communication quality.

What is claimed is:

1. A radio channel assignment method in a time division multiple access mobile telecommunication system having a plurality of radio base stations to which shared radio frequencies have been assigned, and a base station control unit for controlling each of the radio base stations, wherein the radio frequencies are shared with radio base stations, each radio frequency is assigned as a radio channel, on a per time-slot basis, to a mobile station, and a radio channel is specified by the radio frequency and the time-slot, said method comprising the steps of:

managing, by said base station control unit, and with regard to each radio frequency, the number of a radio base station that is using this radio frequency, the number of a mobile station that is using this radio frequency in each time slot, and data indicating whether this radio frequency is a frequency that has been assigned for shared use with the radio base stations;

if it has become necessary for a mobile station currently communicating via a predetermined radio channel to be handed over from a radio base station with which it is currently communicating to an adjacent radio base station, determining, by said base station control unit, whether the frequency currently being used by the mobile station is a shared assigned frequency and whether this frequency has been assigned to another mobile station in another time slot;

changing over, by said base radio station control unit, the radio base station using the frequency of the mobile station from the current radio base station to the adjacent radio base station, without changing the frequency currently being used by the mobile station, when the frequency currently being used by the mobile station is a shared assigned frequency and this frequency has not been assigned to other mobile station in any other time slot;

implementing handover by activating a radio channel of a prescribed time slot of the shared frequency at said adjacent radio base station; and after handover to said adjacent radio base station is made, notifying, by said adjacent radio base station, said mobile station of the fact that the radio base station has been changed over.

2. The method according to claim 1, wherein said base station control unit implements handover without changing the frequency used by the mobile station and the assignment time slot of said frequency.

3. The method according to claim 1, wherein said base station control unit implements handover by changing only the assignment time slot to a time slot other than the time slot used thus far, without changing the frequency used by the mobile station.

4. The method according to claim 1, wherein said base station control unit:

determines whether the adjacent radio base station has a newly assignable idle radio channel when it has become necessary for the mobile station to be handed over from the radio base station with which it is currently communicating to the adjacent radio base station;

assigns an idle channel to the mobile station as the radio channel if this idle channel exists; and changes over the radio base station using the frequency of the radio channel of the mobile station from the current radio base station to the adjacent radio base station if an idle channel does not exist.

5. The method according to claim 1, wherein when it has become necessary for the mobile station to be handed over from the radio base station with which it is currently communicating to the adjacent radio base station, the mobile station requests said base station control unit to implement the handover without changing the current radio channel.

6. The method according to claim 1, wherein said base station control unit instructs the adjacent radio base station to activate the radio channel assigned to the mobile station;

said adjacent radio base station activates the radio channel designated by said base station control unit;

said current radio base station sends the mobile station a message designating a radio channel to which a changeover is to be made; and said mobile station changes over the radio channel in accordance with said message.

7. The method according to claim 1, wherein said base station control unit instructs the adjacent radio base station to activate the radio channel assigned to the mobile station;

said adjacent radio base station activates the radio channel designated by said base station control unit;

said current radio base station terminates transmission of the frequency used by the mobile station; and said mobile station exchanges synchronizing signals with said adjacent radio base station via said radio channel and continues data communication.

8. A radio channel assignment method in a time division multiple access mobile telecommunication system having a plurality of radio base stations to which shared radio frequencies have been assigned, and a base station control unit for controlling each of the radio base stations, wherein the radio frequencies are shared with radio base stations, each radio frequency is assigned as a radio channel, on a per time-slot basis, to a mobile station, and a radio channel is specified by the radio frequency and the time-slot, said method comprising the steps of:

managing, by said base station control unit, and with regard to each radio frequency, the number of a radio base station that is using this radio frequency, the number of a mobile station that is using this radio frequency in each time slot, and data indicating whether this radio frequency is a frequency that has been assigned for shared use with the radio base stations;

if it has become necessary for a mobile station currently communicating via a predetermined radio channel to be handed over from a radio base station with which it is currently communicating to an adjacent radio base station, determining, by said base station control unit, whether the frequency currently being used by the mobile station is a shared assigned frequency and whether this frequency has been assigned to other mobile station in another time slot;

when the frequency currently being used by the mobile station is a shared assigned frequency and this frequency has been assigned to other mobile station in another time slot, determining, by said base station control unit, condition of radio waves between said other mobile station and said adjacent radio base station;

implementing handover by said base station control unit without changing the frequency used by each mobile station if the condition of the radio waves is acceptable, said handover being made by changing over the radio base station using said frequency from the current radio base station to the adjacent radio base station; and after handover to said adjacent radio base station is made, notifying, by said adjacent radio base station, said mobile station of the fact that the radio base station has been changed over.

9. The method according to claim 8, wherein handover is implemented without changing the frequency used by each mobile station and the assignment time slot of said frequency.

10. The method according to claim 8, wherein handover is implemented by changing only the assignment time slot to a time slot other than the time slot used thus far, without changing the frequency used by each mobile station.

* * * * *